United States Patent
Wang

(10) Patent No.: US 12,127,078 B2
(45) Date of Patent: Oct. 22, 2024

(54) BROADCAST METHOD AND APPARATUS FOR VIRTUAL NETWORK GROUP, DEVICE, AND SYSTEM

(71) Applicant: TENCENT TECHNOLOGY (SHENZHEN) COMPANY LIMITED, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 549 days.

(21) Appl. No.: 17/372,141

(22) Filed: Jul. 9, 2021

(65) Prior Publication Data

US 2021/0337362 A1    Oct. 28, 2021

Related U.S. Application Data

(63) Continuation of application No. PCT/CN2020/094233, filed on Jun. 3, 2020.

(30) Foreign Application Priority Data

Jun. 17, 2019   (CN) .......................... 201910523825.4

(51) Int. Cl.
    *H04W 4/06*    (2009.01)
(52) U.S. Cl.
    CPC ..................................... *H04W 4/06* (2013.01)
(58) Field of Classification Search
    CPC ....................................................... H04W 4/06
    See application file for complete search history.

(56) References Cited

U.S. PATENT DOCUMENTS

| 2018/0192289 | A1  | 7/2018 | Dao |
| 2019/0158985 | A1  | 5/2019 | Dao |
| 2020/0187276 | A1  | 6/2020 | Wang et al. |
| 2020/0205225 | A1  | 6/2020 | Hu |
| 2020/0228936 | A1* | 7/2020 | Talebi Fard .......... H04W 8/186 |

(Continued)

FOREIGN PATENT DOCUMENTS

| CN | 109428945 A | 3/2019 |
| CN | 109548175 A | 3/2019 |

(Continued)

OTHER PUBLICATIONS

The European Patent Office (EPO) The Extended European Search Report for 20825980.4, Mar. 10, 2022 10 Pages.

(Continued)

*Primary Examiner* — Charles N Appiah
*Assistant Examiner* — Nicole M Louis-Fils
(74) *Attorney, Agent, or Firm* — ANOVA LAW GROUP, PLLC

(57) ABSTRACT

A broadcast method is provided for a virtual network group. The method includes receiving a broadcast data packet transmitted by a member in a virtual network group, a target address of the broadcast data packet being a broadcast address, transmitting the broadcast data packet to a target internal broadcast interface in at least two internal broadcast interfaces, and transmitting the broadcast data packet to all members or all local members in the virtual network group by using the target internal broadcast interface.

19 Claims, 18 Drawing Sheets

(56) References Cited

U.S. PATENT DOCUMENTS

| | | | | |
|---|---|---|---|---|
| 2020/0329417 A1* | 10/2020 | Huang | ............ | H04W 40/02 |
| 2021/0022063 A1* | 1/2021 | Yang | ............ | H04W 40/02 |
| 2021/0274323 A1* | 9/2021 | Xu | ............ | H04W 4/08 |
| 2022/0060416 A1* | 2/2022 | Zhu | ............ | H04L 45/74 |

FOREIGN PATENT DOCUMENTS

| | | |
|---|---|---|
| CN | 109842854 A | 6/2019 |
| CN | 110121155 A | 8/2019 |
| CN | 110247779 A | 9/2019 |
| CN | 111200791 A | 5/2020 |
| WO | 2018137232 A1 | 8/2018 |
| WO | 2018195803 A1 | 11/2018 |
| WO | 2018213490 A1 | 11/2018 |

OTHER PUBLICATIONS

Nokia et al., "5G LAN group communication with UPF autonomous traffic forwarding," 3GPP Draft; S2-1905197 5GL 23501 Local Switch was S2-1903311 VF, 3rd Generation Partnership Project (3GPP), Mobile Competence Centre; 650, Route Des Lucioles; F-06921 Sophia-Antipolis Cedex; France, vol. SA WG2, No. Reno, Nevada, USA; May 2019, pp. 1-10. 10 pages.

Huawei et al., "implementation of 5GLAN related interfaces", 3GPP Draft; 23501_CR1430R2_Vertical_LAN_(REL-16)_S2-1906685 was 6563 TS23.501 CR1430 Implementation of 5GLAN Related Interfaces—R2, 3rd Generation Partnership Project (3GPP), Mobile Competence Centre; 650, Route Des Lucioles; F-06921 Sophia-Antipolis Cedex; France, vol. SA WG2, No. Reno, Nevada, USA; May 2019. 10 pages.

The World Intellectual Property Organization (WIPO) International Search Report for PCT/CN2020/094233 Aug. 27, 2020 7 Pages (including translation).

The State Intellectual Property Office of the People's Republic of China (SIPO) Office Action 1 for for 201910523825.4 Nov. 2, 2020 11 Pages (including translation).

Tencent, "Support for Groupcast Traffic Forwarding of a 5G VN," SA WG2 Meeting #134 S2-1907545, Jun. 28, 2019 (Jun. 28, 2019). 4 pages.

Nokia et al., "5G LAN group communication with UPF autonomous traffic forwarding," SA WG2 Meeting #133 S2-1905197, May 17, 2019 (May 17, 2019). 10 pages.

Huawei et al. "implementation of 5GLAN related interfaces," 3GPP TSG-SA WG2 Meeting #133 S2-1905686, May 17, 2019 (May 17, 2019). 10 pages.

Huawei, Hisilicon, "Support for unicast traffic forwarding within a 5G VN group," 3GPP T5G-5A WG2 Meeting #133 S2-1905682, May 17, 2019 (May 17, 2019). 10 pages.

* cited by examiner

Generate a first PDR, a first FAR, a fourth PDR, and a fourth FAR ⸺ 1202a

Configure, in a process in which each member in the virtual network group establishes a PDU session, a first PDR, a first FAR, a fourth PDR, and a fourth FAR that correspond to the each member for the UPF corresponding to the each member ⸺ 1204a

FIG. 13

Generate a second PDR, a second FAR, a fifth PDR, and a fifth FAR ⸺ 1202b

Configure, in a case that the UPF is a UPF selected by a member in the virtual network group, a second PDR, a second FAR, a fifth PDR, and a fifth FAR for the UPF ⸺ 1204b

FIG. 14

BROADCAST METHOD AND APPARATUS FOR VIRTUAL NETWORK GROUP, DEVICE, AND SYSTEM

RELATED APPLICATION(S)

This application is a continuation application of PCT Patent Application No. PCT/CN2020/094233 filed on Jun. 3, 2020, which claims priority to Chinese Patent Application 201910523825.4, filed on Jun. 17, 2019 and entitled "BROADCAST METHOD AND APPARATUS FOR VIRTUAL NETWORK GROUP, DEVICE, AND SYSTEM", all of which are incorporated herein by reference in entirety.

FIELD OF THE TECHNOLOGY

The present disclosure relates to the field of communication, and in particular, to a broadcast method and apparatus for a virtual network group, a device, and a system.

BACKGROUND

Ethernet communication is introduced in a 5G system.

The concept of a 5G virtual network group (5G VN Group) supporting IP and Ethernet communication is introduced in the release 16 of a new radio (NR) system. In addition, a user plane function based network interface may be provided, to implement a one-to-one communication method in the 5G VN Group.

However, a solution of one-to-many communication is not readily implemented in certain existing 5G VN Group.

SUMMARY

Embodiments of the present disclosure provide a broadcast method and apparatus for a virtual network group, a device, and a system. By providing at least two internal broadcast interfaces in a user plane function (UPF), a broadcast data packet is transmitted to all members or all local members in a virtual network group by using a target internal broadcast interface in the at least two internal broadcast interfaces, so as to implement a solution of one-to-many communication in the virtual network group. The technical solutions are as follows:

In one aspect, the present disclosure provides a broadcast method for a virtual network group is provided. The method is applied to a UPF and includes: receiving a broadcast data packet transmitted by a member in the virtual network group, a target address of the broadcast data packet being a broadcast address; and transmitting the broadcast data packet to a target internal broadcast interface in at least two internal broadcast interfaces, and transmitting the broadcast data packet to all members or all local members in the virtual network group by using the target internal broadcast interface.

In another aspect, the present disclosure provides a broadcast apparatus. The apparatus includes a memory storing computer program instructions, and a processor coupled to the memory and configured to execute the computer program instructions and perform: receiving a broadcast data packet transmitted by a member in a virtual network group, a target address of the broadcast data packet being a broadcast address; transmitting the broadcast data packet to a target internal broadcast interface in at least two internal broadcast interfaces; and transmitting the broadcast data packet to all members or all local members in the virtual network group by using the target internal broadcast interface.

In yet another aspect, the present disclosure provides a non-transitory computer-readable storage medium storing computer program instructions executable by at least one processor to perform: receiving a broadcast data packet transmitted by a member in a virtual network group, a target address of the broadcast data packet being a broadcast address; transmitting the broadcast data packet to a target internal broadcast interface in at least two internal broadcast interfaces; and transmitting the broadcast data packet to all members or all local members in the virtual network group by using the target internal broadcast interface.

In yet another aspect, the present disclosure provides a broadcast method for a virtual network group. The method is applied to a session management function (SMF) and includes: generating a packet detection rule (PDR) and a forwarding action rule (FAR); and configuring the PDR and the FAR for a UPF corresponding to each member in a virtual network group, the PDR and the FAR being used by the UPF to receive a broadcast data packet transmitted by a member in the virtual network group, a target address of the broadcast data packet being a broadcast address; and transmit the broadcast data packet to a target internal broadcast interface in at least two internal broadcast interfaces, and transmit the broadcast data packet to all members or all local members in the virtual network group by using the target internal broadcast interface.

In yet another aspect, the present disclosure provides a broadcast apparatus for a virtual network group. The apparatus includes: a receiving module, configured to receive a broadcast data packet transmitted by a member in a virtual network group, a target address of the broadcast data packet being a broadcast address; and a transmission module, configured to transmit the broadcast data packet to a target internal broadcast interface in at least two internal broadcast interfaces, and transmit the broadcast data packet to all members or all local members in the virtual network group by using the target internal broadcast interface.

The technical solutions provided in the embodiments of the present disclosure achieve at least the following beneficial effects:

By providing at least two internal broadcast interfaces, when receiving a broadcast data packet transmitted by a member in a virtual network group, a UPF transmits the broadcast data packet to a target internal broadcast interface in the at least two internal broadcast interfaces, and transmits the broadcast data packet to all members in the virtual network group by using the target internal broadcast interface, so that one-to-many communication is implemented in the virtual network group, thereby implementing a broadcast function in the virtual network group.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 13 is a schematic flowchart of a broadcast method for a virtual network group according to one or more embodiments of the present disclosure;

FIG. 14 is a schematic flowchart of a broadcast method for a virtual network group according to one or more embodiments of the present disclosure;

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Figure 1:
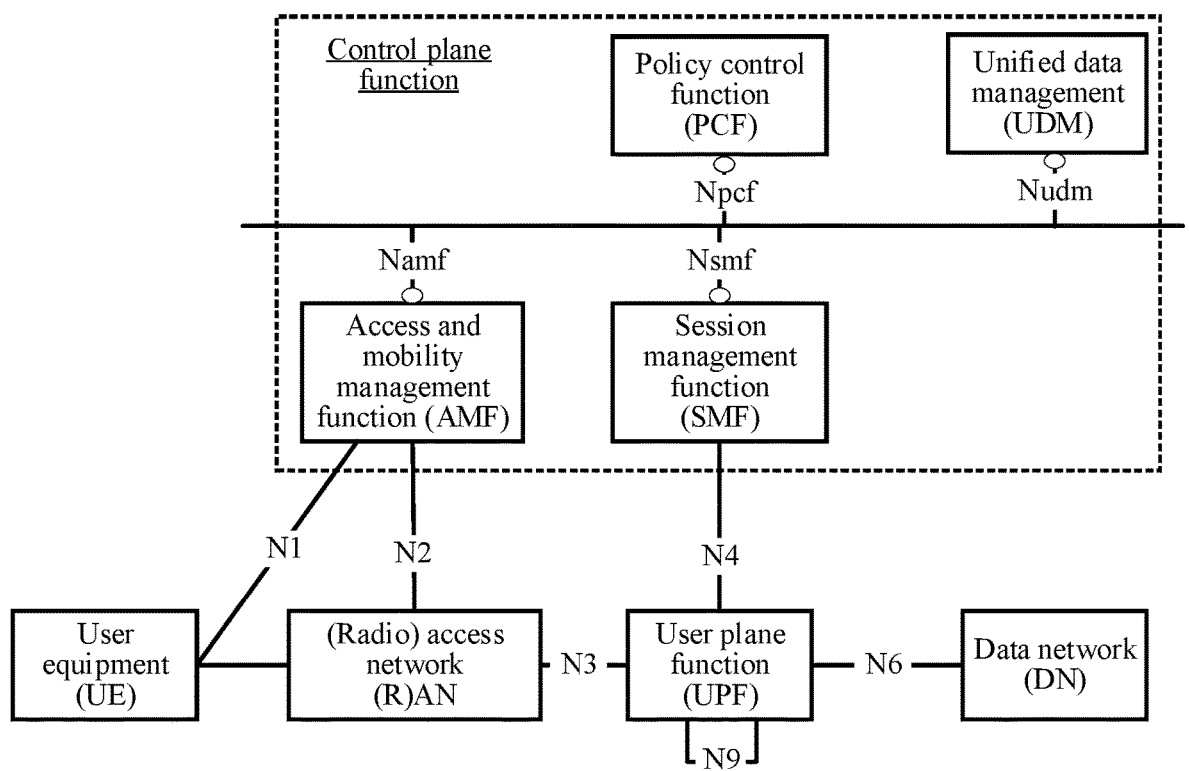
FIG. 1 is a schematic block diagram of an evolved core network architecture according to one or more embodiments of the present disclosure.

FIG. 1 is a block diagram of a 5G communication system according to an exemplary embodiment of this disclosure. The communication system may be an NR-based 5G system, and also include a 5G system based on an evolved UMTS terrestrial radio access network (eUTRAN) and a subsequent evolved system of the 5G system. The communication system is defined to support data connection and services, so that technologies such as network functions virtualization (NFV) and software-defined networking (SDN) can be used during network deployment. The communication system may be formed by network functions (NFs), and is deployed by using distributed functions and according to actual requirements. Addition or removing of a new NF does not affect the function of the entire network. The communication system includes: user equipment (UE) (a mobile terminal named by 3GPP), a (radio) access network ((R)AN), a UPF, a data network (DN), and a control plane function.

The control plane function includes: an access and mobility management function (AMF), an SMF, a policy control function (PCF), and a unified data management (UDM).

The UE communicates with the RAN by using an air interface. The RAN communicates with the UPF by using a first reference point N3. Two UPFs communicate with each other by using a second reference point N9. A PDU session anchor point user plane function (PSA UPF) communicates with the DN by using a third reference point N6.

There may be a plurality of UEs, a plurality of RANs, a plurality of UPFs, and a plurality of DNs. When there are a plurality of UPFs, some UPFs may be PSA UPFs of UE. Two PSA UPFs communicate with each other by using a fourth reference point N19 (which is not shown in FIG. 1).

The UE communicates with the AMF by using a fifth reference point N1. The RAN communicates with the AMF by using a sixth reference point N2. The UPF communicates with the SMF by using a seventh reference point N4.

A network architecture shown in FIG. 1 includes the following reference points:

N1: A reference point between the UE and the AMF.
N2: A reference point between the (R)AN and the AMF.
N3: A reference point between the (R)AN and the UPF.
N4: A reference point between the SMF and the UPF.
N6: A reference point between the PSA UPF and the DN.
N9: A reference point between two UPFs.
N14: A reference point between two AMFs.
N19: A reference point (which is not shown in the figure) between two PSA UPFs of a 5G LAN-type service.

The network architecture shown in FIG. 1 includes the following reference service-based interfaces:

$N_{amf}$: A service-based interface displayed by the AMF.
$N_{smf}$: A service-based interface displayed by the SMF.
$N_{pcf}$: A service-based interface displayed by the PCF.
$N_{udm}$: A service-based interface displayed by the UDM.

Communication in a virtual network group includes one-to-one communication and one-to-many communication. One-to-one communication supports to forward unicast communication between two UEs in the virtual network group or between UE and a device in the DN. One-to-many communication supports to forward broadcast data from UE (or a device in the DN) to all UEs and all devices in the DN in the virtual network group, or forward the broadcast data from UE (or a device in the DN) to some UEs and some devices in the DN in the virtual network group.

The broadcast communication refers to that broadcast data transmitted by a member (UE or a device) in the virtual network group may need to be transmitted to all members in the virtual network group. Based on the core network architecture shown in FIG. 1, the embodiments of the present disclosure provide the following three communication manners supporting broadcast communication:

Manner 1: A Local Exchange Manner (Based on the First Reference Point N3 or the Second Reference Point N9):

When members of the virtual network group include two UEs connected to the same PSA UPF, broadcast data is exchanged directly between the two UEs in the PSA UPF, and the broadcast data does not need to be transmitted to the third reference point N6 for being transmitted outside and then returned by an external router or a switch.

Figure 2:
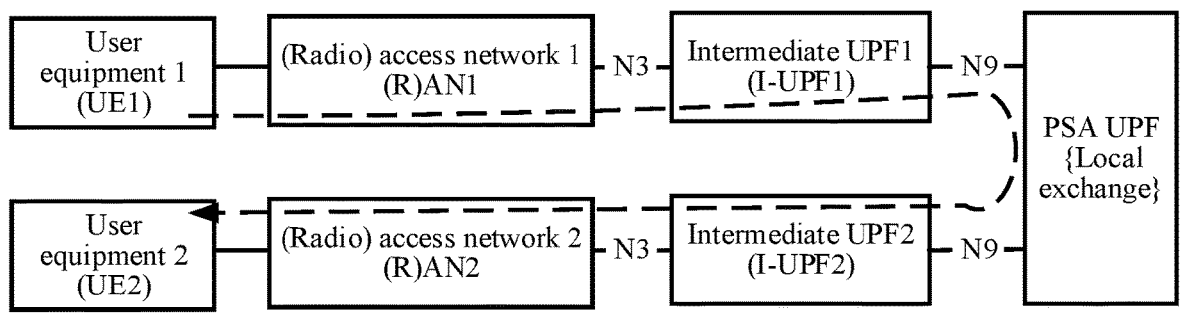
FIG. 2 is a schematic diagram of N3/N9-based broadcast communication according to one or more embodiments of the present disclosure.

Referring to FIG. 2, UE 1 communicates with an RAN 1, and the RAN 1 communicates with an intermediate UPF 1. UE 2 communicates with an RAN 2, and the RAN 2 communicates with an intermediate UPF 2. The UE 1 and the UE 2 are connected to the same PSA UPF. When the UE 1 transmits a broadcast data packet, the broadcast data packet is exchanged directly in the PSA UPF. Therefore, the broadcast data packet is only transmitted to the UE 2, and does not need to be transmitted to the third reference point N6 for being transmitted outside.

Manner 2: A manner based on the third reference point N6:

When members of the virtual network group include UE and a device in the DN, broadcast data may need to be exchanged between the UE and the device by using the N6.

Figure 3:
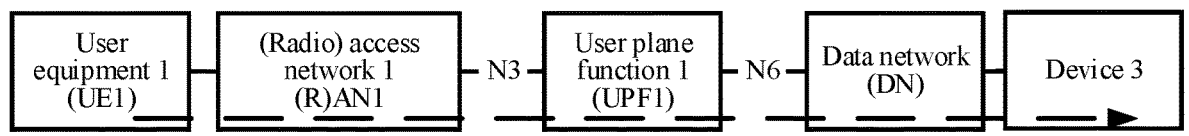
FIG. 3 is a schematic diagram of N6-based broadcast communication according to one or more embodiments of the present disclosure.

Referring to FIG. 3, UE 1 communicates with an RAN 1, the RAN 1 communicates with a UPF 1, and a PSA UPF 1 communicates with the DN. When transmitting a broadcast data packet, the UE 1 may need to transmit the broadcast data packet to a device 3 in the DN by using the N6.

Manner 3: A manner based on the fourth reference point N19:

When members of the virtual network group include two UEs connected to different PSA UPFs, broadcast data may need to be exchanged between the two UEs by using the fourth reference point N19, and an N19 tunnel is established between the two PSA UPFs.

Figure 4:
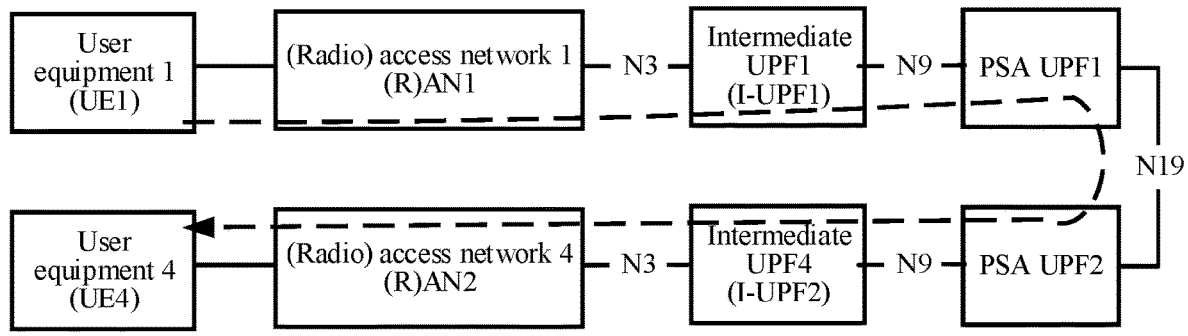
FIG. 4 is a schematic diagram of N19-based broadcast communication according to one or more embodiments of the present disclosure.

Referring to FIG. 4, UE 1 communicates with an RAN 1, and the RAN 1 communicates with an intermediate UPF 1. UE 4 communicates with an RAN 2, and the RAN 2 communicates with an intermediate UPF 2. The UE 1 and the UE 4 are respectively connected to different PSA UPFs: a PSA UPF 1 and a PSA UPF 2, and an N19 tunnel is established between the two PSA UPFs. When the UE 1 transmits a broadcast data packet, the broadcast data packet may need to be exchanged through the N19 tunnel between the two PSA UPFs, to transmit the broadcast data packet to the UE 4.

Figure 5:
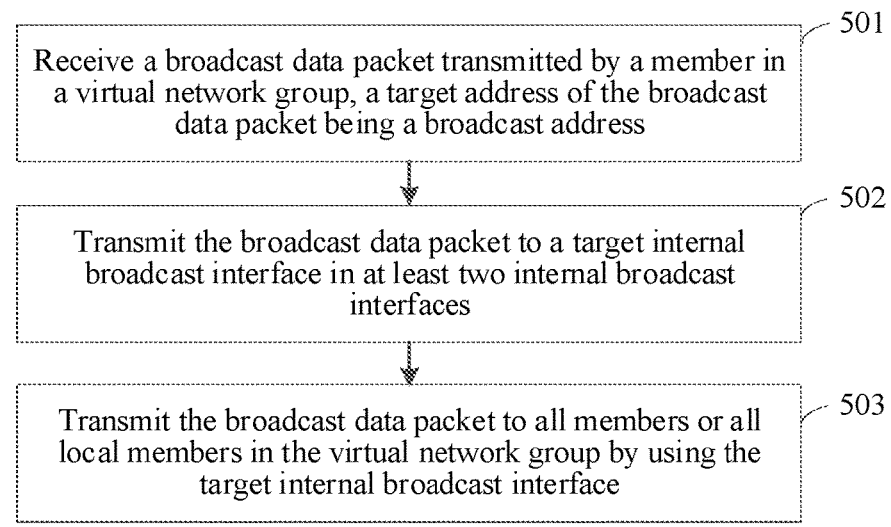
FIG. 5 is a schematic flowchart of a broadcast method for a virtual network group according to one or more embodiments of the present disclosure.

FIG. 5 is a flowchart of a broadcast method for a virtual network group according to an exemplary embodiment of the present disclosure. The method may be performed by a UPF, and include the following steps:

Step 501. The UPF receives a broadcast data packet transmitted by a member in a virtual network group, a target address of the broadcast data packet being a broadcast address.

The broadcast data packet is determined by using a target IP address or a destination media access control (MAC) address. In certain embodiments, a destination IP/MAC address in the broadcast data packet is a broadcast address (such as an IPv4 broadcast address is 255.255.255.255 or 192.168.1.255, and a broadcast MAC address is FF:FF:FF:FF:FF:FF). There may be a plurality of broadcast addresses (for example, three or five broadcast addresses) in the same virtual network group, and the plurality of broadcast addresses may form a broadcast address list. A target address in a broadcast data packet is a broadcast address in the broadcast address list.

Step 502. The UPF transmits the broadcast data packet to a target internal broadcast interface in at least two internal broadcast interfaces.

Figure 6:
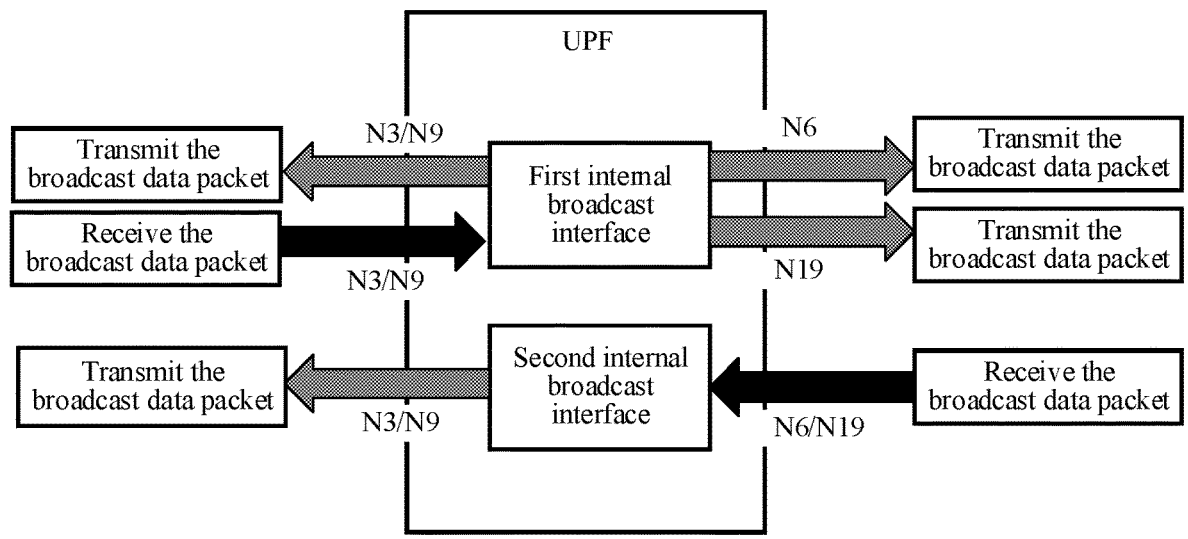
FIG. 6 is a schematic block diagram of two internal broadcast interfaces according to one or more embodiments of the present disclosure.

A PSA UPF provides at least two internal broadcast interfaces. Referring to FIG. 6, the at least two internal broadcast interfaces include:

First internal broadcast interface: configured to receive a broadcast data packet transmitted by a local member by using an N3/N9, and transmit the broadcast data packet to all other members (which may include the member transmitting the broadcast data packet) in the virtual network group by using the N3/N9, an N6, or an N19. Taking a 5G system as an example, the first internal broadcast interface may be referred to as 5G VN BC internal R, or another name.

Second internal broadcast interface: configured to transmit a broadcast data packet, transmitted by a non-local member by using the N6/N19, to all local members of the PSA UPF in the virtual network group by using the N3/N9. Taking a 5G system as an example, the second internal broadcast interface may be referred to as 5G VN BC internal C, or another name.

In certain embodiments, the local member includes UE using a current UPF as a PDU session anchor point in the virtual network group.

Step 503. The UPF transmits the broadcast data packet to all members or all local members in the virtual network group by using the target internal broadcast interface.

In conclusion, according to the method provided in this embodiment, at least two internal broadcast interfaces are provided in a UPF, and when a broadcast data packet of a member is received, the broadcast data packet is first transmitted to a target internal broadcast interface in the at least two internal broadcast interfaces, and is then transmitted to all members or all local members in a virtual network group by using the target internal broadcast interface, to implement broadcast communication in the virtual network group.

For each PSA UPF in the virtual network group, at least two internal broadcast interfaces of the PSA UPF may have at least the following different implementations:

First implementation: two internal broadcast interfaces: a first internal broadcast interface and a second internal broadcast interface.

Second implementation: three internal broadcast interfaces: a first internal broadcast interface, a second internal broadcast interface, and a third internal broadcast interface.

Third implementation: a plurality of internal broadcast interfaces: one first internal broadcast interface and n second internal broadcast interfaces, each second internal broadcast interface being corresponding to one broadcast address, and n being a quantity of broadcast addresses; or one first internal broadcast interface, n second internal broadcast interfaces, and n third internal broadcast interfaces, each second internal broadcast interface being corresponding to one broadcast address, each third internal broadcast interface being corresponding to one broadcast address, and n being a quantity of broadcast addresses; or n first internal broadcast interfaces, and n second internal broadcast interfaces, each first internal broadcast interface being corresponding to one broadcast address, each second internal broadcast interface being corresponding to one broadcast address, and n being a quantity of broadcast addresses; or n first internal broadcast interfaces, n second internal broadcast interfaces, and n third internal broadcast interfaces, each first internal broadcast interface being corresponding to one broadcast address, each second internal broadcast interface being corresponding to one broadcast address, each third internal broadcast interface being corresponding to one broadcast address, and n being a quantity of broadcast addresses.

In the following embodiments, the internal broadcast interface is described from the perspective of a single PSA UPF. However, a plurality of PSA UPFs may be involved in the entire broadcast data packet transmission process, and a processing process of each PSA UPF may be the same or similar. Broadcast communication in the entire virtual network group is implemented through transmission in a plurality of PSA UPFs, and each PSA UPF is not described again in the present disclosure.

Figure 7:
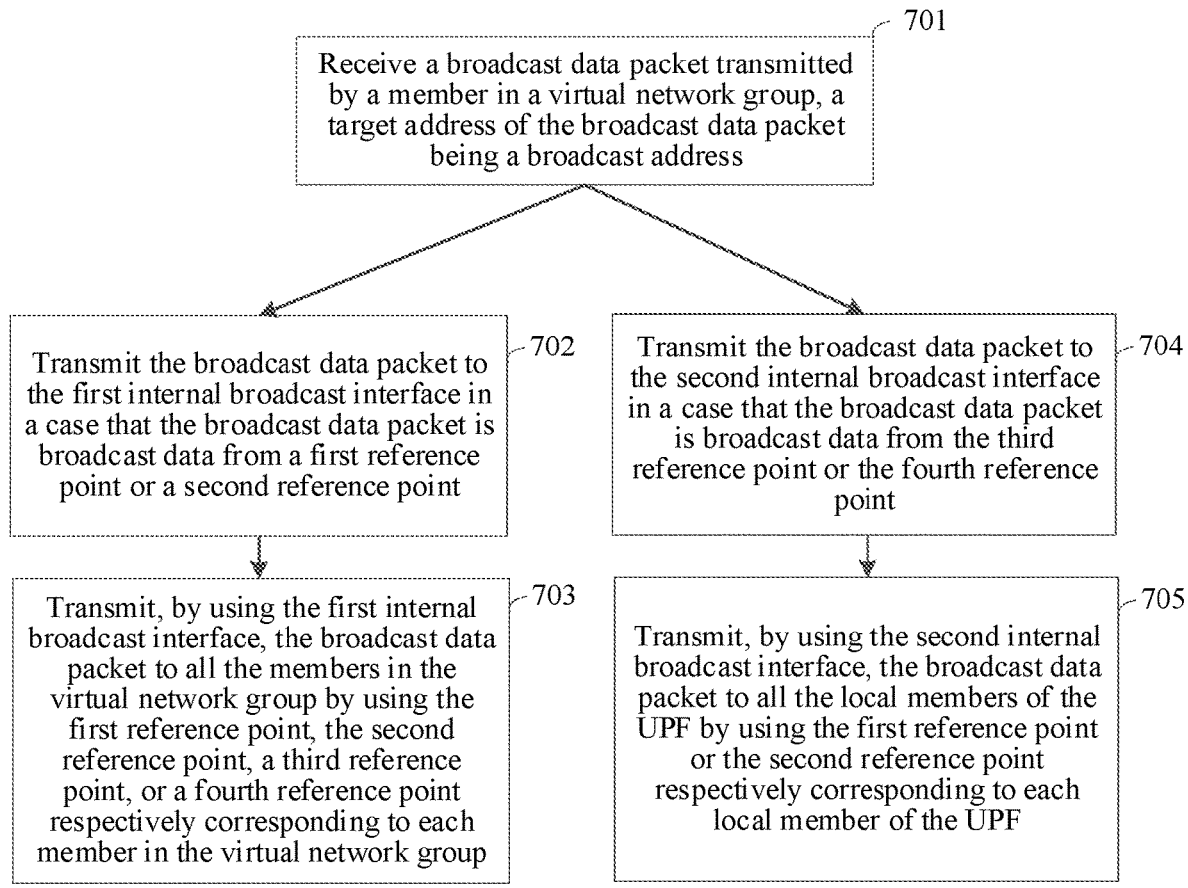
FIG. 7 is a schematic flowchart of a broadcast method for a virtual network group according to one or more embodiments of the present disclosure.

For the First Implementation:

FIG. 7 is a flowchart of a broadcast method for a virtual network group according to an exemplary embodiment of the present disclosure. The method may be performed by a UPF, and include the following steps:

Step 701. The UPF receives a broadcast data packet transmitted by a member in a virtual network group, a target address of the broadcast data packet being a broadcast address.

Assuming that the member transmitting the broadcast data packet is a member A, the member A may be any member in the virtual network group. When there are a plurality of broadcast addresses in the virtual network group, a target address of the broadcast data packet is one of the plurality of broadcast addresses.

When the member A is a local member of the UPF, the UPF receives the broadcast data packet of the member A by using an N3/N9; and when the member A is a non-local member of the UPF, the UPF receives the broadcast data packet of the member A by using an N6/N19.

Step 702. The UPF transmits the broadcast data packet to the first internal broadcast interface when in response to determining the broadcast data packet is broadcast data from a first reference point or a second reference point.

When receiving a broadcast data packet transmitted by a local member by using an N3 or an N9, the UPF transmits the broadcast data packet to the first internal broadcast interface.

Step 703. The UPF transmits, by using the first internal broadcast interface, the broadcast data packet to all the members in the virtual network group by using the first reference point, the second reference point, a third reference point, or a fourth reference point respectively corresponding to each member in the virtual network group.

Figure 8:
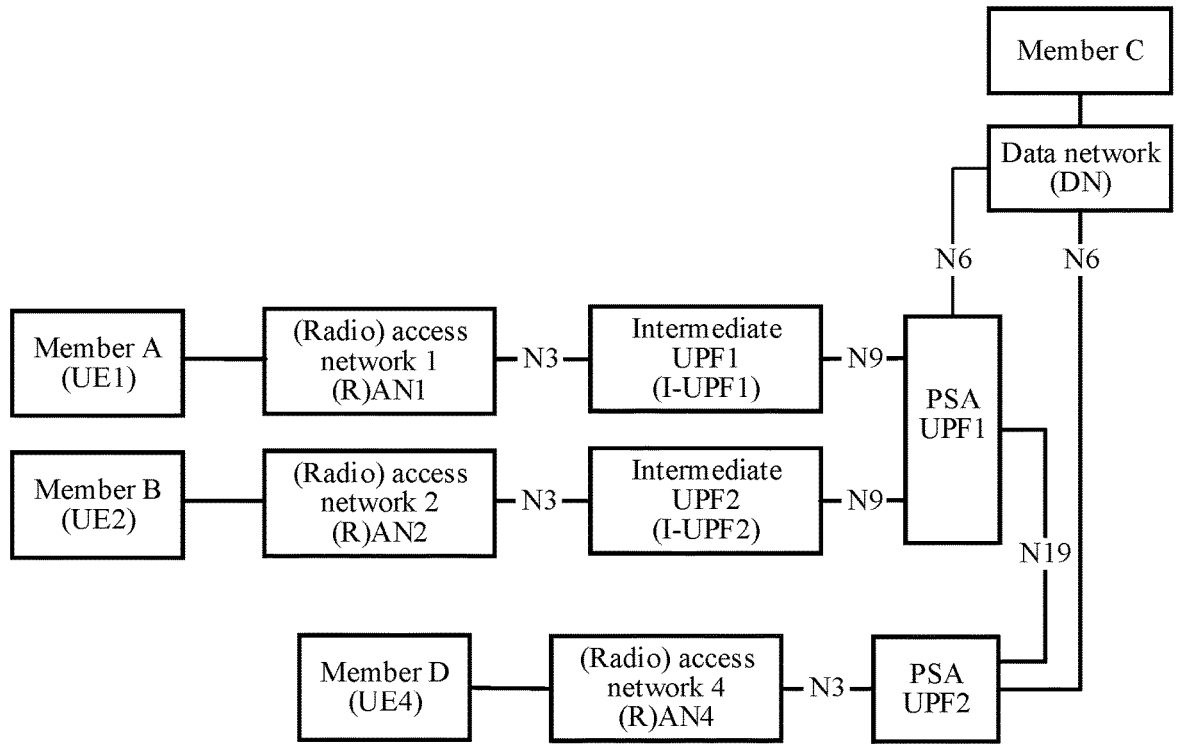
FIG. 8 is a schematic diagram of a virtual network group according to one or more embodiments of the present disclosure.

As shown in FIG. 8, when or in response to determining the member A transmits a broadcast data packet: when a member B is a member that is connected to the same PSA UPF as the member A, the UPF transmits, by using the first internal broadcast interface, the broadcast data packet to the member B by using an N3 or an N9 corresponding to the member B; when a member C is a device in a DN, the UPF transmits, by using the first internal broadcast interface, the broadcast data packet to the member C by using an N6 corresponding to the member C; and when a member D is a member that is connected to a PSA UPF different from that to which the member A is connected, the UPF transmits, by using the first internal broadcast interface, the broadcast data packet to the member D by using an N19 corresponding to the member D.

"All the members" in this step may include the member transmitting the broadcast data packet, or may not include the member transmitting the broadcast data packet.

Step 704. The UPF transmits the broadcast data packet to the second internal broadcast interface when in response to determining the broadcast data packet is broadcast data from the third reference point or the fourth reference point.

When receiving a broadcast data packet transmitted by a non-local member by using the N6 or the N19, the UPF transmits the broadcast data packet to the second internal broadcast interface.

Step 705. The UPF transmits, by using the second internal broadcast interface, the broadcast data packet to all the local members of the UPF by using the first reference point or the second reference point respectively corresponding to each local member of the UPF.

In an example shown in FIG. 8, when the member C transmits a broadcast data packet, a PSA UPF 1 receives the broadcast data packet from the N6, puts the broadcast data packet into a second internal broadcast interface of the PSA UPF 1, and then transmits, by using the second internal broadcast interface, the broadcast data packet to the member A by using the N9 corresponding to the member A, and to the member B by using the N9 corresponding to the member B. A PSA UPF 2 may also receive the broadcast data packet from the N6, put the broadcast data packet into a second internal broadcast interface of the PSA UPF 2, and then transmit, by using the second internal broadcast interface of the PSA UPF 2, the broadcast data packet to the member D by using the N3 corresponding to the member D. In this way, the broadcast data packet transmitted by the member C is transmitted to all the members.

In another example shown in FIG. 8, when the member A transmits a broadcast data packet, the PSA UPF 1 receives the broadcast data packet from the N9, puts the broadcast data packet into a first internal broadcast interface of the PSA UPF 1, and then transmits, by using the first internal broadcast interface, the broadcast data packet to the member B by using the N9 interface corresponding to the member B (the PSA UPF 1 may further transmit the broadcast data packet to the member A by using the N9 interface according to network configuration), to the member C in the DN by using the N6 interface, and to the PSA UPF 2 by using the N19 interface. The PSA UPF 2 receives the broadcast data packet from the N19, puts the broadcast data packet into a second internal broadcast interface of the PSA UPF 2, and then transmits, by using the second internal broadcast interface, the broadcast data packet to the local member D by using the N3 interface. In this way, the broadcast data packet transmitted by the member A is transmitted to all the members.

In conclusion, according to the method provided in this embodiment, a first internal broadcast interface is provided in a UPF, and when a broadcast data packet of a local member is received, the broadcast data packet of the local member is first transmitted to the first internal broadcast interface, and is then transmitted to all members in a virtual network group by using the first internal broadcast interface (in a path other than the current UPF, the broadcast data packet may be further transmitted to all the members in the virtual network group by using a second internal broadcast interface or a third internal broadcast interface of another UPF), to implement broadcast communication in the virtual network group.

According to the method provided in this embodiment, a second internal broadcast interface is provided in a UPF, and when a broadcast data packet of a non-local member is received, the broadcast data packet of the non-local member is first transmitted to the second internal broadcast interface, and is then transmitted to all local members connected to the UPF by using the second internal broadcast interface. Therefore, not only broadcast communication in a virtual network group can be implemented, but also unnecessary traffic forwarding can be avoided, saving network transmission resources.

In certain embodiments based on FIG. 7, an implementation process of forwarding broadcast traffic in a virtual network group is as follows: for each UPF in the virtual network group, at least two internal broadcast interfaces in the each UPF are used. Forwarding of a broadcast data packet between the internal broadcast interfaces of the each UPF is performed by using the following two steps:

In the first step, a broadcast data packet received (by using the N3, N9, N6, or N19) from any member in the virtual network group is monitored by a PDR installed in the UPF, and an FAR in the UPF is applied, to forward the broadcast data packet to an internal broadcast interface of the UPF, that is, a target interface disposed for the internal broadcast interface.

In the second step, the broadcast data packet is detected by a PDR installed in the internal broadcast interface of the UPF, and after the broadcast data packet matches the PDR, a corresponding FAR in the internal broadcast interface is applied, to forward the broadcast data packet to all members or all local members in the corresponding virtual network group by using the N3, N6, N9, or N19.

Therefore, N4 rules (that is, the PDR and the FAR) are configured for each UPF in the virtual network group. Exemplary configuration of the PDR and the FAR is as follows:

First PDR and First FAR

An SMF provides a first PDR and a first FAR for an N4 session of each member (that is, an N4 session corresponding to a PDU session of each member) in the virtual network group, so that the UPF may process a broadcast data packet received from the UE.

Figure 9:
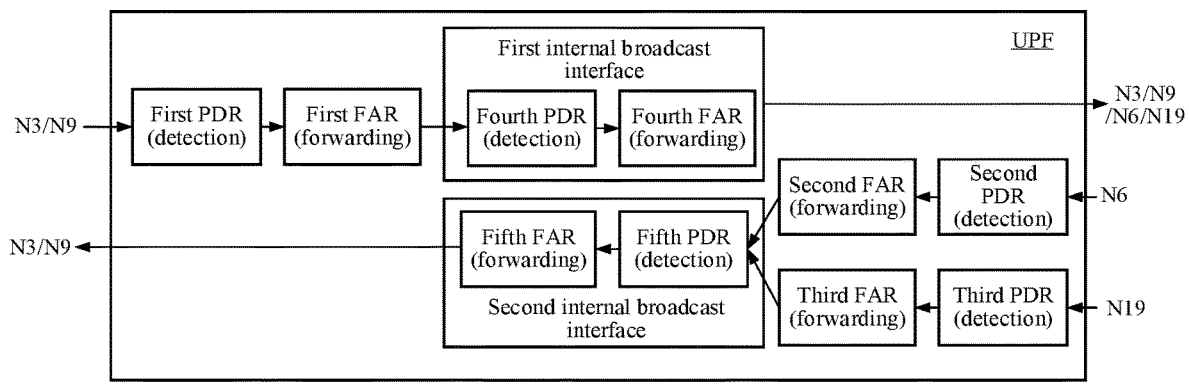
FIG. 9 is a schematic diagram of rule configuration of two internal broadcast interfaces according to one or more embodiments of the present disclosure.

For each UPF in the virtual network group, the UPF is provided with a first PDR and a first FAR that correspond to each local member. The UPF transmits, when in response to determining it is detected, by using the first PDR, that the broadcast data packet is broadcast data from the first reference point N3 or the second reference point N9, the broadcast data packet to the first internal broadcast interface by using the first FAR, as shown in FIG. 9.

To monitor traffic, the first PDR includes that: a source interface is set as an access side, a target address is set as a broadcast address list, and core network tunnel information is set as a tunnel header of a first reference point or a second reference point of a PDU session (including an uplink IP address and uplink GTP-U TEID information corresponding to the N3 interface or the N9 interface). The GTP-U TEID is an abbreviation for GPRS tunneling protocol tunnel endpoint identifier.

To forward the traffic, the first FAR includes that: a target interface is set as the first internal broadcast interface.

Second PDR and Second FAR

An SMF configures a second PDR and a second FAR that correspond to a group-level session for the UPF, so that the UPF may process a broadcast data packet received from the N6. The group-level session is a session shared by members in the virtual network group, and a session between the UPF and the SMF, that is, a group-level N4 session.

For each UPF in the virtual network group (or there is a UPF that may be needed), the UPF is provided with a second PDR and a second FAR that correspond to a group-level session. When in response to determining it is detected, by using the second PDR, that the broadcast data packet is broadcast data from the third reference point N6, the UPF transmits the broadcast data packet to the second internal broadcast interface by using the second FAR, as shown in FIG. 9.

To monitor traffic, the second PDR includes that: a source interface is set as a core side, and a target address is set as a broadcast address list.

To forward the traffic, the second FAR includes that: a target interface is set as the second internal broadcast interface.

Third PDR and Third FAR

An SMF configures a third PDR and a third FAR that correspond to a group-level session for the UPF, so that the UPF may process a broadcast data packet received from the N19.

For each UPF in the virtual network group (or there is a UPF that may be needed), the UPF is provided with a third PDR and a third FAR that correspond to a group-level session. When in response to determining it is detected, by using the third PDR, that the broadcast data packet is broadcast data from the fourth reference point N19, the UPF transmits the broadcast data packet to the third internal broadcast interface by using the third FAR, as shown in FIG. 9.

To monitor traffic, the third PDR includes that: a source interface is set as a core side, a target address is set as a broadcast address list, and core network tunnel information is set as a tunnel header of the fourth reference point (including a receiving IP address and receiving GTP-U TEID information that correspond to the N19).

To forward the traffic, the third FAR includes that: a target interface is set as the second internal broadcast interface.

Fourth PDR and Fourth FAR

An SMF provides a fourth PDR and a fourth FAR for an N4 session of each member (that is, an N4 session corresponding to a PDU session of each member) in the virtual network group, so that the UPF may process a broadcast data packet received from the UE.

For each UPF in the virtual network group, the UPF is provided with a fourth PDR and a fourth FAR that correspond to each local member. The UPF transmits, when in response to determining it is detected, by using the fourth PDR, that the broadcast data packet is broadcast data from the first internal broadcast interface, the broadcast data packet to all the members in the virtual network group by using the first reference point, the second reference point, the third reference point, or the fourth reference point respectively corresponding to each member in the virtual network group by using the fourth FAR, as shown in FIG. 9.

To monitor traffic, the fourth PDR includes that: a source interface is set as the first internal broadcast interface, and a target address is set as a broadcast address list.

To forward the traffic, corresponding to a local member, the fourth FAR includes that: an external header creates tunnel information indicating the first reference point N3 or the second reference point N9 (including a downlink IP address and downlink GTP-U TEID information corresponding to the N3 interface or the N9 interface), and a target interface is an access side; or corresponding to a device in the DN, the fourth FAR further includes that: an external header creates information indicating the third reference point N6, and a target interface is a core side; or corresponding to a member connected to an N19 tunnel, the fourth FAR includes that: an external header creates tunnel information indicating the fourth reference point N19 (including an IP address and GTP-U TED information of a counterpart PSA UPF corresponding to the N19 interface), and a target interface is a core side.

Fifth PDR and Fifth FAR

An SMF configures a fifth PDR and a fifth FAR that correspond to a group-level session for the UPF, so that the UPF may process a broadcast data packet received from the N6 or the N19.

The UPF is provided with a fifth PDR and a fifth FAR that correspond to a group-level session. The UPF transmits, when in response to determining it is detected, by using the fifth PDR, that the broadcast data packet is broadcast data from the second internal broadcast interface, the broadcast data packet to all the local members of the UPF by using the first reference point N3 or the second reference point N9 respectively corresponding to each local member of the UPF by using the fifth FAR, as shown in FIG. 9.

To monitor traffic, the fifth PDR includes that: a source interface is set as the second internal broadcast interface, and a target address is set as a broadcast address list.

To forward the traffic, the fifth FAR includes that: an external header creates tunnel information indicating the first reference point N3 or the second reference point N9 (including a downlink IP address and downlink GTP-U TED information corresponding to the N3 interface or the N9 interface), and a target interface is an access side.

Figure 10:
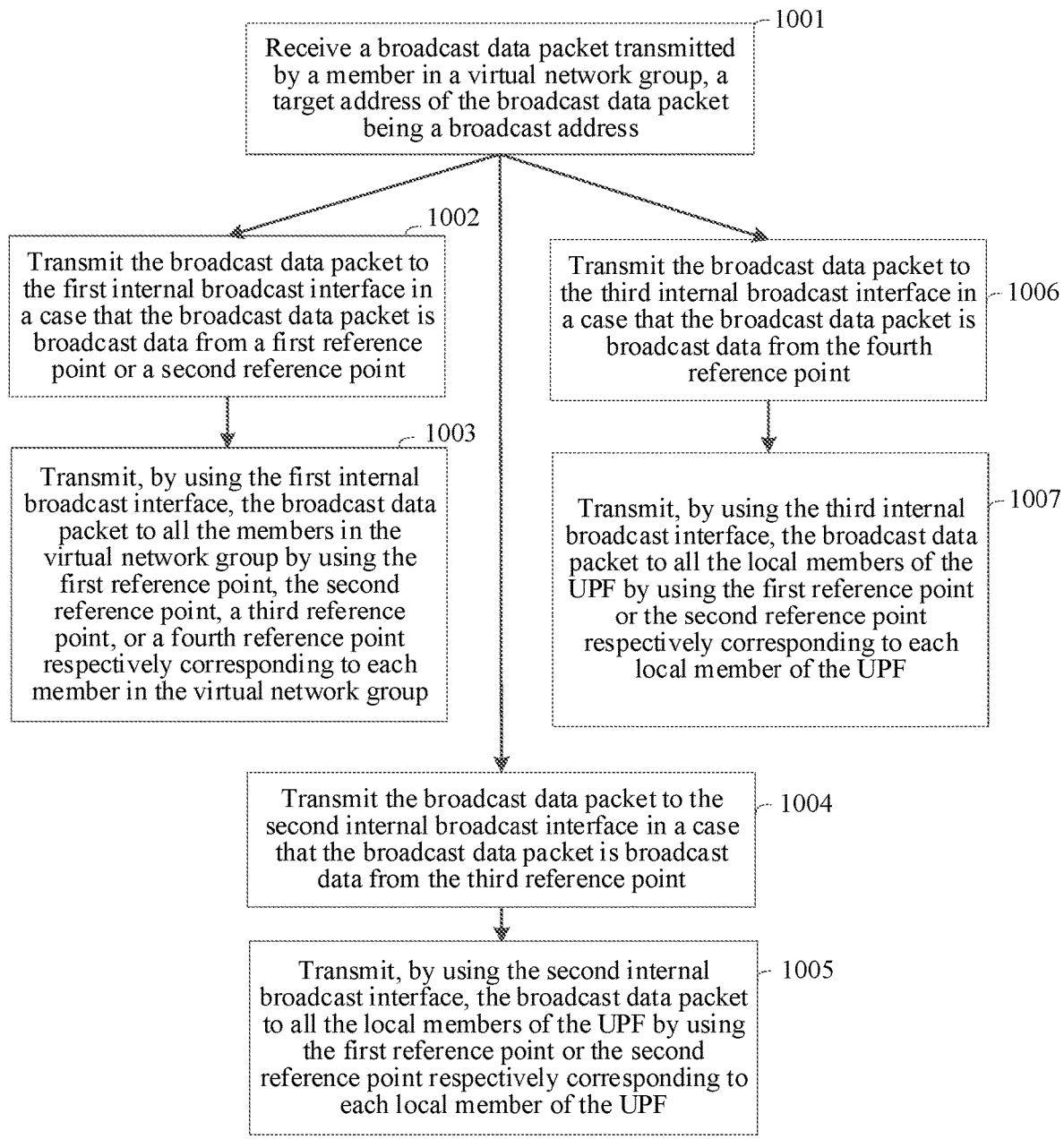
FIG. 10 is a schematic flowchart of a broadcast method for a virtual network group according to one or more embodiments of the present disclosure.

For the Second Implementation:

FIG. 10 is a flowchart of a broadcast method for a virtual network group according to an exemplary embodiment of the present disclosure. The method may be performed by a UPF, and include the following steps:

Step 1001. The UPF receives a broadcast data packet transmitted by a member in a virtual network group, a target address of the broadcast data packet being a broadcast address.

Assuming that the member transmitting the broadcast data packet is a member A, the member A may be any member in the virtual network group. When there are a plurality of broadcast addresses in the virtual network group, a target address of the broadcast data packet is one of the plurality of broadcast addresses.

When the member A is a local member of the UPF, the UPF receives the broadcast data packet of the member A by using an N3/N9; and when the member A is a non-local member of the UPF, the UPF receives the broadcast data packet of the member A by using an N6/N19.

Step 1002. The UPF transmits the broadcast data packet to the first internal broadcast interface when in response to determining the broadcast data packet is broadcast data from a first reference point or a second reference point.

When receiving a broadcast data packet transmitted by a local member by using an N3 or an N9, the UPF transmits the broadcast data packet to the first internal broadcast interface.

Step 1003. The UPF transmits, by using the first internal broadcast interface, the broadcast data packet to all the members in the virtual network group by using the first reference point, the second reference point, a third reference point, or a fourth reference point respectively corresponding to each member in the virtual network group.

As shown in FIG. 8, the member A transmits a broadcast data packet, and when a member B is a member that is connected to the same PSA UPF as the member A, the UPF transmits, by using the first internal broadcast interface, the broadcast data packet to the member B by using an N3 or an N9 corresponding to the member B; when a member C is a device in a DN, the UPF transmits, by using the first internal broadcast interface, the broadcast data packet to the member C by using an N6 corresponding to the member C; and when a member D is a member that is connected to a PSA UPF different from that to which the member A is connected, the UPF transmits, by using the first internal broadcast interface, the broadcast data packet to a PSA UPF 2 connected to the member D by using an N19 corresponding to the member D, and the PSA UPF 2 transmits the broadcast data packet to a third internal broadcast interface of the PSA UPF 2, and then transmits, by using the third internal broadcast interface of the PSA UPF 2, the broadcast data packet to the member D by using the N3 interface or the N9 interface.

"All the members" in this step may include the member transmitting the broadcast data packet, or may not include the member transmitting the broadcast data packet.

Step 1004. The UPF transmits the broadcast data packet to the second internal broadcast interface when in response to determining the broadcast data packet is broadcast data from the third reference point.

When receiving a broadcast data packet transmitted by a non-local member by using the N6, the UPF transmits the broadcast data packet to the second internal broadcast interface.

Step 1005. The UPF transmits, by using the second internal broadcast interface, the broadcast data packet to all the local members of the UPF by using the first reference point or the second reference point respectively corresponding to each local member of the UPF.

In an example shown in FIG. 8, when the member C transmits a broadcast data packet, a PSA UPF 1 receives the broadcast data packet from the N6, puts the broadcast data packet into a second internal broadcast interface of the PSA UPF 1, and then transmits, by using the second internal broadcast interface, the broadcast data packet to the member A by using the N9 corresponding to the member A, and to the member B by using the N9 corresponding to the member B. A PSA UPF 2 may also receive the broadcast data packet from the N6, put the broadcast data packet into a second internal broadcast interface of the PSA UPF 2, and then transmit, by using the second internal broadcast interface of the PSA UPF 2, the broadcast data packet to the member D by using the N3 corresponding to the member D. In this way, the broadcast data packet transmitted by the member C is transmitted to all the members.

Step 1006. The UPF transmits the broadcast data packet to the third internal broadcast interface when in response to determining the broadcast data packet is broadcast data from the fourth reference point.

When receiving a broadcast data packet transmitted by a non-local member by using the N19, the UPF transmits the broadcast data packet to the third internal broadcast interface.

Step 1007. The UPF transmits, by using the third internal broadcast interface, the broadcast data packet to all the local members of the UPF by using the first reference point or the second reference point respectively corresponding to each local member of the UPF.

In another example shown in FIG. 8, when the member A transmits a broadcast data packet, the PSA UPF 1 receives the broadcast data packet from the N9, puts the broadcast data packet into a first internal broadcast interface of the PSA UPF 1, and then transmits, by using the first internal broadcast interface, the broadcast data packet to the member B by using the N9 interface corresponding to the member B (the PSA UPF 1 may further transmit the broadcast data packet to the member A by using the N9 interface according to network configuration), to the member C in the DN by using the N6 interface, and to the PSA UPF 2 by using the N19 interface. The PSA UPF 2 receives the broadcast data packet from the N19, puts the broadcast data packet into a third internal broadcast interface of the PSA UPF 2, and then transmits, by using the third internal broadcast interface, the broadcast data packet to the local member D by using the N3 interface. In this way, the broadcast data packet transmitted by the member A is transmitted to all the members.

In conclusion, according to the method provided in this embodiment, a first internal broadcast interface is provided in a UPF, and when a broadcast data packet of a local member is received, the broadcast data packet of the local member is first transmitted to the first internal broadcast interface, and is then transmitted to all members in a virtual network group by using the first internal broadcast interface, to implement broadcast communication in the virtual network group.

According to the method provided in this embodiment, a second internal broadcast interface is provided in a UPF, and when a broadcast data packet of a non-local member is received from an N6, the broadcast data packet of the non-local member is first transmitted to the second internal broadcast interface, and is then transmitted to all local members connected to the UPF by using the second internal broadcast interface. Therefore, not only broadcast communication in a virtual network group can be implemented, but also unnecessary traffic forwarding can be avoided, saving network transmission resources.

According to the method provided in this embodiment, a third internal broadcast interface is provided in a UPF, and when a broadcast data packet of a non-local member is received from an N19, the broadcast data packet of the non-local member is first transmitted to the third internal broadcast interface, and is then transmitted to all local members connected to the UPF by using the third internal broadcast interface. Therefore, not only broadcast communication in a virtual network group can be implemented, but also unnecessary traffic forwarding can be avoided, saving network transmission resources.

In certain embodiments based on FIG. 10, an implementation process of forwarding broadcast traffic in a virtual network group is as follows: for each UPF in the virtual network group, at least two internal broadcast interfaces in the each UPF are used. Forwarding of a broadcast data packet between the internal broadcast interfaces of the each UPF is performed by using the following two steps:

In the first step, a broadcast data packet received (by using the N3, N9, N6, or N19) from any member in the virtual network group is monitored by a PDR installed in the UPF, and when the broadcast data packet matches the PDR, an FAR in the UPF is applied, to forward the broadcast data packet to an internal broadcast interface of the UPF, that is, a target interface disposed for the internal broadcast interface.

In the second step, the broadcast data packet is detected by a PDR installed in the internal broadcast interface of the UPF, and after the broadcast data packet matches the PDR, a corresponding FAR in the internal broadcast interface is applied, to forward the broadcast data packet to all members or all local members in the virtual network group by using the N3, N6, N9, or N19.

Therefore, N4 rules (that is, the PDR and the FAR) are configured for each UPF in the virtual network group. Exemplary configuration of the PDR and the FAR is as follows:

First PDR and First FAR

An SMF provides a first PDR and a first FAR for an N4 session of each member (that is, an N4 session corresponding to a PDU session of each member) in the virtual network group, so that the UPF may process a broadcast data packet received from the UE.

Figure 11:
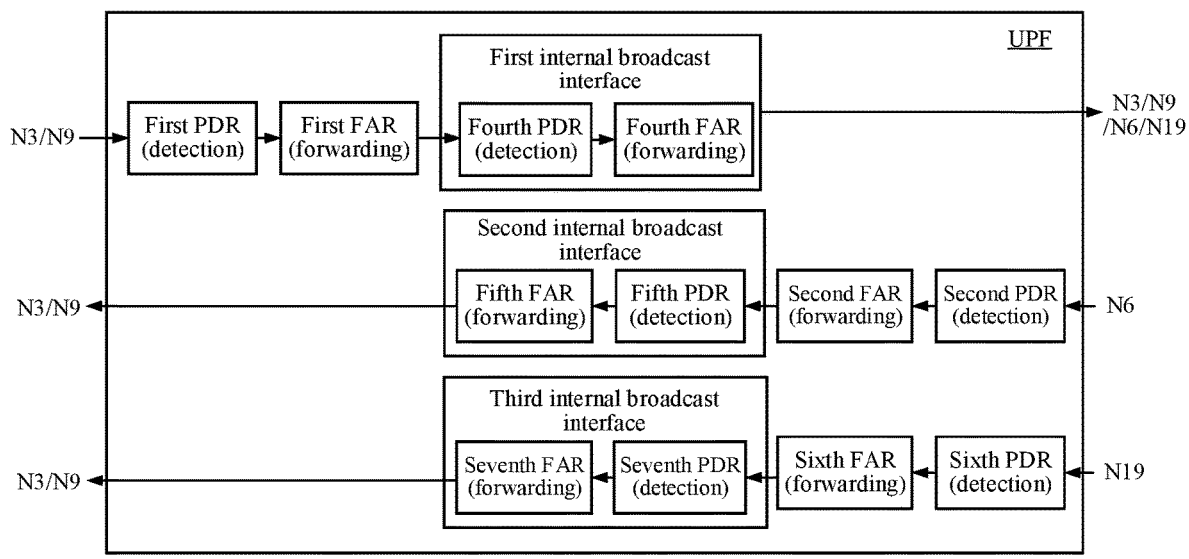
FIG. 11 is a schematic diagram of rule configuration of three internal broadcast interfaces according to one or more embodiments of the present disclosure.

For each UPF in the virtual network group, the UPF is provided with a first PDR and a first FAR that correspond to each local member. The UPF transmits, when in response to determining it is detected, by using the first PDR, that the broadcast data packet is broadcast data from the first reference point N3 or the second reference point N9, the broadcast data packet to the first internal broadcast interface by using the first FAR, as shown in FIG. 11.

To monitor traffic, the first PDR includes that: a source interface is set as an access side, a target address is set as a broadcast address list, and core network tunnel information is set as a tunnel header of a first reference point or a second reference point of a PDU session (including an uplink IP address and uplink GTP-U TEID information corresponding to the N3 interface or the N9 interface).

To forward the traffic, the first FAR includes that: a target interface is set as the first internal broadcast interface.

Second PDR and Second FAR

An SMF configures a second PDR and a second FAR that correspond to a group-level session for the UPF, so that the UPF may process a broadcast data packet received from the N6. The group-level session is a session shared by members in the virtual network group, and a session between the UPF and the SMF, that is, a group-level N4 session.

For each UPF in the virtual network group (or there is a UPF that may be needed), the UPF is provided with a second PDR and a second FAR that correspond to a group-level session. When in response to determining it is detected, by using the second PDR, that the broadcast data packet is broadcast data from the third reference point N6, the UPF transmits the broadcast data packet to the second internal broadcast interface by using the second FAR, as shown in FIG. 11.

To monitor traffic, the second PDR includes that: a source interface is set as a core side, and a target address is set as a broadcast address list.

To forward the traffic, the second FAR includes that: a target interface is set as the second internal broadcast interface.

Sixth PDR and Sixth FAR

An SMF configures a sixth PDR and a sixth FAR that correspond to a group-level session for the UPF, so that the UPF may process a broadcast data packet received from the N19.

For each UPF in the virtual network group (or there is a UPF that may be needed), the UPF is provided with a sixth PDR and a sixth FAR that correspond to a group-level session. When in response to determining it is detected, by using the sixth PDR, that the broadcast data packet is broadcast data from the fourth reference point N19, the UPF transmits the broadcast data packet to the third internal broadcast interface by using the sixth FAR, as shown in FIG. 11.

To monitor traffic, the sixth PDR includes that: a source interface is set as a core side, a target address is set as a broadcast address list, and core network tunnel information is set as a tunnel header of the fourth reference point (including an IP address and GTP-U TEID information that correspond to the N19 interface).

To forward the traffic, the sixth FAR includes that: a target interface is set as the third internal broadcast interface.

Fourth PDR and Fourth FAR

An SMF provides a fourth PDR and a fourth FAR for an N4 session of each member (that is, an N4 session corresponding to a PDU session of each member) in the virtual network group, so that the UPF may process a broadcast data packet received from the UE.

For each UPF in the virtual network group, the UPF is provided with a fourth PDR and a fourth FAR that correspond to each local member. The UPF transmits, when in response to determining it is detected, by using the fourth PDR, that the broadcast data packet is broadcast data from the first internal broadcast interface, the broadcast data packet to all the members in the virtual network group by using the first reference point, the second reference point, the third reference point, or the fourth reference point respectively corresponding to each member in the virtual network group by using the fourth FAR.

To monitor traffic, the fourth PDR includes that: a source interface is set as the first internal broadcast interface, and a target address is set as a broadcast address list.

To forward the traffic, corresponding to a local member, the fourth FAR includes that: an external header creates tunnel information indicating the first reference point N3 or the second reference point N9 (including a downlink IP address and downlink GTP-U TEID information corresponding to the N3 interface or the N9 interface), and a target interface is an access side; or corresponding to a device in the DN, the fourth FAR further includes that: an external header creates information indicating the third reference point N6, and a target interface is a core side; or corresponding to a member connected to an N19 tunnel, the fourth FAR includes that: an external header creates tunnel information indicating the fourth reference point N19 (including an IP address and GTP-U TEID information corresponding to the N19 interface), and a target interface is a core side.

Fifth PDR and Fifth FAR

An SMF configures a fifth PDR and a fifth FAR that correspond to a group-level session for the UPF, so that the UPF may process a broadcast data packet received from the N6.

The UPF is provided with a fifth PDR and a fifth FAR that correspond to a group-level session. The UPF transmits, when in response to determining it is detected, by using the fifth PDR, that the broadcast data packet is broadcast data from the second internal broadcast interface, the broadcast data packet to all the local members of the UPF by using the first reference point N3 or the second reference point N9 respectively corresponding to each local member of the UPF by using the fifth FAR.

To monitor traffic, the fifth PDR includes that: a source interface is set as the second internal broadcast interface, and a target address is set as a broadcast address list.

To forward the traffic, the fifth FAR includes that: an external header creates tunnel information indicating the first reference point N3 or the second reference point N9 (including a downlink IP address and downlink GTP-U TEID information corresponding to the N3 interface or the N9 interface), and a target interface is an access side.

Seventh PDR and Seventh FAR

An SMF configures a seventh PDR and a seventh FAR that correspond to a group-level session for the UPF, so that the UPF may process a broadcast data packet received from the N19.

The UPF is provided with a seventh PDR and a seventh FAR that correspond to a group-level session. The UPF transmits, when in response to determining it is detected, by using the seventh PDR, that the broadcast data packet is broadcast data from the third internal broadcast interface, the broadcast data packet to all the local members of the UPF by using the first reference point N3 or the second reference point N9 respectively corresponding to each local member of the UPF by using the seventh FAR.

To monitor traffic, the seventh PDR includes that: a source interface is set as the third internal broadcast interface, and a target address is set as a broadcast address list.

To forward the traffic, the seventh FAR includes that: an external header creates tunnel information indicating the first reference point N3 or the second reference point N9 (including a downlink IP address and downlink GTP-U TEID information corresponding to the N3 interface or the N9 interface), and a target interface is an access side.

For the Third Implementation:

The broadcast address list in the PDR and the FAR include a plurality of broadcast addresses, for example, three broadcast addresses or five broadcast addresses.

When there are m broadcast addresses in the broadcast address list, at least one interface in the first internal broadcast interface, the second internal broadcast interface, and the third internal broadcast interface may be implemented as m internal broadcast interfaces, and each internal broadcast interface corresponds to one broadcast address. m is a positive integer, and i is an integer not greater than m.

When the first internal broadcast interface is implemented as m first internal broadcast interfaces, an ith first internal broadcast interface corresponds to an ith broadcast address, and the ith broadcast address is a broadcast address in the broadcast data packet; the first PDR includes that: a source interface is set as an access side, a target address is set as the ith broadcast address, and core network tunnel information is set as a tunnel header of a first reference point or a second reference point of a PDU session; the first FAR includes that: a target interface is set as the ith first internal broadcast interface; the fourth PDR includes that: a source interface is set as the ith first internal broadcast interface, and a target address is set as the ith broadcast address; and the fourth FAR includes that: an external header creates tunnel information indicating the first reference point or the second reference point, and a target interface is the access side; or the fourth FAR further includes that: an external header creates information indicating a third reference point, and a target interface is a core side; or the fourth FAR further includes that: an external header creates tunnel information indicating a fourth reference point, and a target interface is a core side.

When the second internal broadcast interface is implemented as m second internal broadcast interfaces, an ith second internal broadcast interface corresponds to an ith broadcast address, and the ith broadcast address is a broadcast address in the broadcast data packet; the second PDR includes that: a source interface is set as a core side, and a target address is set as the ith broadcast address; the second FAR includes that: a target interface is set as the ith second internal broadcast interface; the third PDR includes that: a source interface is set as a core side, a target address is set as the ith broadcast address, and core network tunnel information is set as a tunnel header of the fourth reference point; and the third FAR includes that: a target interface is set as the ith second internal broadcast interface, m being a positive integer, and i being an integer not greater than m.

The fifth PDR includes that: a source interface is set as the ith second internal broadcast interface, and a target address is set as the ith broadcast address; and the fifth FAR includes that: an external header creates tunnel information indicating the first reference point or the second reference point, and a target interface is an access side.

When the third internal broadcast interface is implemented as m third internal broadcast interfaces, an ith third internal broadcast interface corresponds to an ith broadcast address, and the ith broadcast address is a broadcast address in the broadcast data packet; the sixth PDR includes that: a source interface is set as a core side, a target address is set as the ith broadcast address, and core network tunnel information is set as a tunnel header of the fourth reference point; the sixth FAR includes that: a target interface is set as the ith third internal broadcast interface; the seventh PDR includes that: a source interface is set as the ith third internal broadcast interface, and a target address is set as the ith broadcast address; and the seventh FAR includes that: an external header creates tunnel information indicating the first reference point or the second reference point, and a target interface is an access side.

An example in which the at least two internal broadcast interfaces include: a first internal broadcast interface and m second internal broadcast interfaces is used. Each second internal broadcast interface corresponds to one broadcast address, and m is a quantity of broadcast addresses.

The UPF transmits the broadcast data packet to the first internal broadcast interface when in response to determining the broadcast data packet is broadcast data from a first reference point or a second reference point, and transmits, by using the first internal broadcast interface, the broadcast data packet to all the members in the virtual network group by using the first reference point, the second reference point, a third reference point, or a fourth reference point respectively corresponding to each member in the virtual network group.

The UPF transmits, when in response to determining the broadcast data packet is broadcast data from the third reference point or the fourth reference point, and a broadcast address of the broadcast data packet is an ith broadcast address, the broadcast data packet to the second internal broadcast interface corresponding to the ith broadcast address, and transmits, by using the second internal broadcast interface corresponding to the ith broadcast address, the broadcast data packet to all the local members of the UPF by using the first reference point or the second reference point respectively corresponding to each local member of the UPF.

For an embodiment in which there are m first internal broadcast interfaces, and an embodiment in which there are m third internal broadcast interfaces, content that is easy to be obtained by a person skilled in the art according to the foregoing embodiment is not described again.

Broadcast addresses corresponding to different internal broadcast interfaces may be the same, or may be different, which is not limited.

A Configuration Process of a PDR and an FAR

Figure 12:
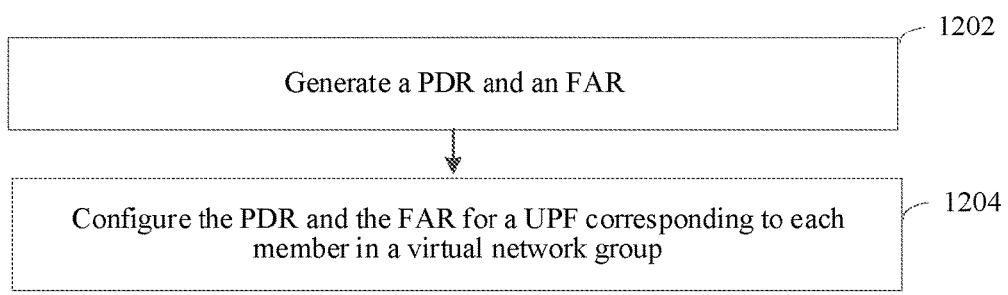
FIG. 12 is a schematic flowchart of a broadcast method for a virtual network group according to one or more embodiments of the present disclosure.

The PDR and the FAR are configured by an SMF for a corresponding UPF. FIG. 12 is a flowchart of a broadcast method for a virtual network group according to an exemplary embodiment of the present disclosure. The method may be performed by an SMF, and include the following steps:

Step 1202. The SMF generates a PDR and an FAR.

The PDR and the FAR are also referred to as broadcast rules or N4 rules. Names of the PDR and the FAR are not limited in this embodiment.

Step 1204. The SMF configures the PDR and the FAR for a UPF corresponding to each member in a virtual network group.

The PDR and the FAR are used by the UPF to receive a broadcast data packet transmitted by a member in the virtual network group, a target address of the broadcast data packet being a broadcast address; and transmit the broadcast data packet to a target internal broadcast interface in at least two internal broadcast interfaces, and transmit the broadcast data packet to all members or all local members in the virtual network group by using the target internal broadcast interface.

It may be learned from the foregoing embodiment that, the at least two internal broadcast interfaces have a plurality of types of implementations.

As shown in FIG. 13, when the at least two internal broadcast interfaces include a first internal broadcast interface, step 1202 and step 1204 may be implemented as the following steps:

Step 1202*a*. The SMF generates a first PDR, a first FAR, a fourth PDR, and a fourth FAR.

For descriptions related to "the first PDR and the first FAR" and "the fourth PDR and the fourth FAR", reference may be made to the description in the foregoing embodiments. Details are not described again in this embodiment.

Step 1204*a*. The SMF configures, in a process in which each member in the virtual network group establishes a PDU session, a first PDR, a first FAR, a fourth PDR, and a fourth FAR that correspond to the each member for the UPF corresponding to the each member.

As shown in FIG. 14, when the at least two internal broadcast interfaces include a second internal broadcast interface, step 1202 and step 1204 may be implemented as the following steps:

Step 1202b. The SMF generates a second PDR, a second FAR, a fifth PDR, and a fifth FAR.

For descriptions related to "the second PDR and the second FAR" and "the fifth PDR and the fifth FAR", reference may be made to the description in the foregoing embodiments. Details are not described again in this embodiment.

Step 1204b. The SMF configures, when in response to determining the UPF is a UPF selected by a member in the virtual network group, a second PDR, a second FAR, a fifth PDR, and a fifth FAR for the UPF.

In certain embodiments, when in response to determining the UPF is a UPF that is selected for the first time by a member in the virtual network group, a second PDR, a second FAR, a fifth PDR, and a fifth FAR that are related to a group-level N6 interface are configured for each UPF that is selected for the first time.

Because there may be a plurality of members in the virtual network group, there may also be a plurality of selected UPFs, each UPF being connected to a DN by using the N6 interface.

Figure 15:
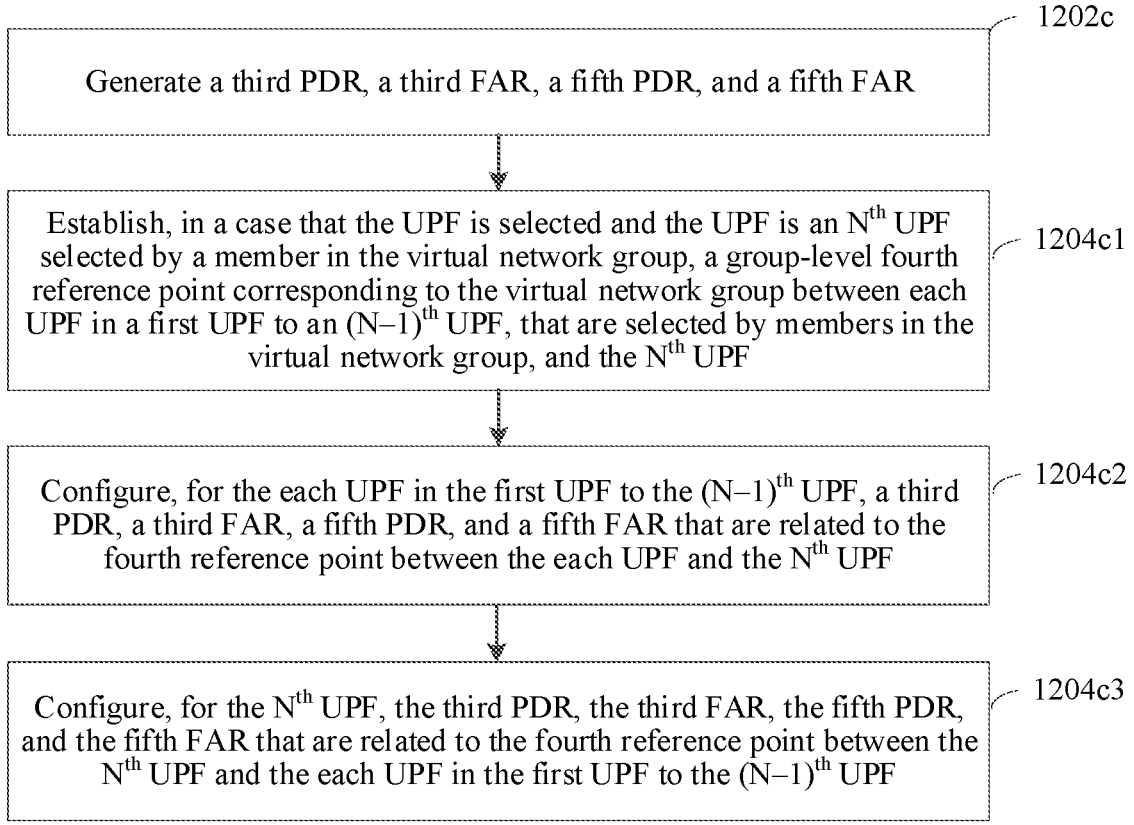
FIG. 15 is a schematic flowchart of a broadcast method for a virtual network group according to one or more embodiments of the present disclosure.

As shown in FIG. 15, when the at least two internal broadcast interfaces include a second internal broadcast interface, step 1202 and step 1204 may be implemented as the following steps:

Step 1202c. The SMF generates a third PDR, a third FAR, a fifth PDR, and a fifth FAR.

For descriptions related to "the third PDR and the third FAR" and "the fifth PDR and the fifth FAR", reference may be made to the description in the foregoing embodiments. Details are not described again in this embodiment.

Step 1204c1. Establish, when in response to determining the UPF is selected and the UPF is an Nth UPF selected by a member in the virtual network group, a group-level fourth reference point corresponding to the virtual network group between each UPF in a first UPF to an (N−1)th UPF, that are selected by members in the virtual network group, and the Nth UPF, N being an integer greater than or equal to 2.

In certain embodiments, when in response to determining the UPF is selected for the first time and the UPF is an Nth UPF selected by a member in the virtual network group, a group-level fourth reference point N19 tunnel corresponding to the virtual network group is established between each UPF in a first UPF to an (N−1)th UPF, that are selected by members in the virtual network group, and the Nth UPF.

In certain embodiments, referring to FIG. 8, when the PSA UPF 2 is a UPF that is selected for the first time by the member D, and the PSA UPF 2 is a second UPF selected by a member in the virtual network group (when or in response to determining that the PSA UPF 1 is a first UPF selected by a member in the virtual network group already exists), an N19 GTP-U tunnel is established between the PSA UPF 2 and the PSA UPF 1.

Step 1204c2. The SMF configures, for the each UPF in the first UPF to the (N−1)th UPF, a third PDR, a third FAR, a fifth PDR, and a fifth FAR that are related to the fourth reference point between the each UPF and the Nth UPF.

Step 1204c3. The SMF configures, for the Nth UPF, the third PDR, the third FAR, the fifth PDR, and the fifth FAR that are related to the fourth reference point between the Nth UPF and the each UPF in the first UPF to the (N−1)th UPF.

Figure 16:
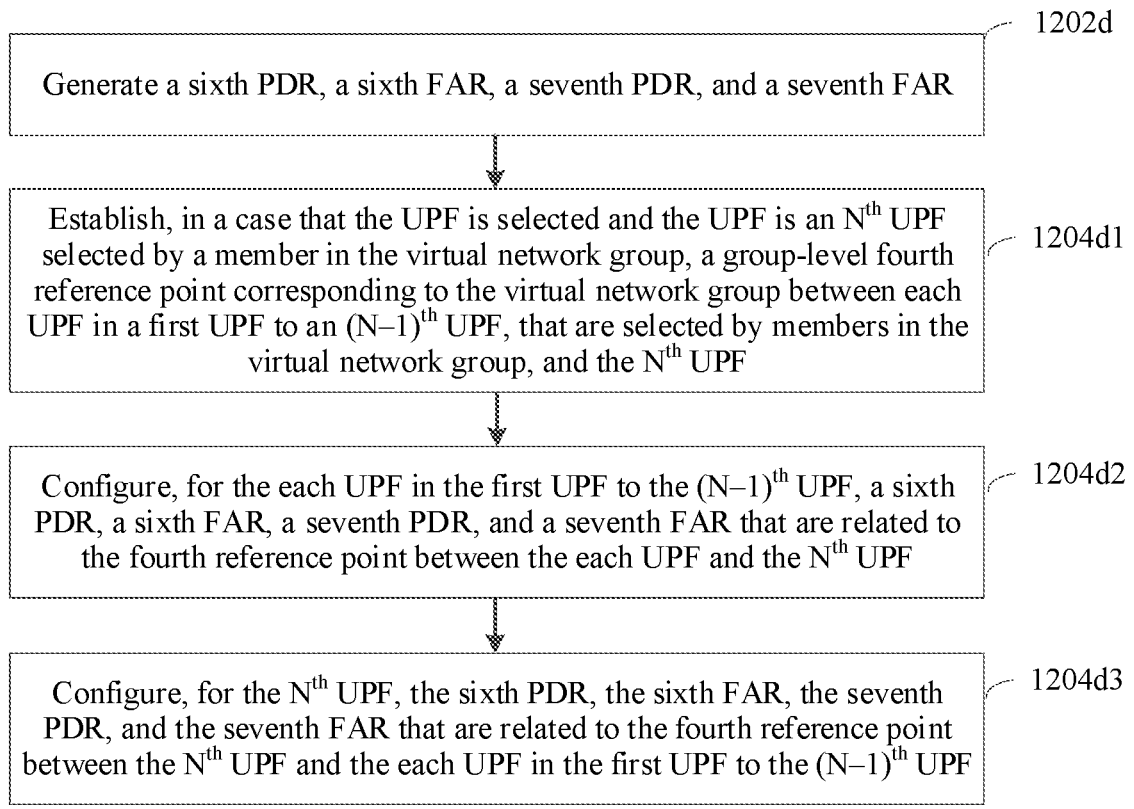
FIG. 16 is a schematic flowchart of a broadcast method for a virtual network group according to one or more embodiments of the present disclosure.

As shown in FIG. 16, when the at least two internal broadcast interfaces include a third internal broadcast interface, step 1202 and step 1204 may be implemented as the following steps:

Step 1202d. The SMF generates a sixth PDR, a sixth FAR, a seventh PDR, and a seventh FAR.

For descriptions related to "the sixth PDR and the sixth FAR" and "the seventh PDR and the seventh FAR", reference may be made to the description in the foregoing embodiments. Details are not described again in this embodiment.

Step 1204d1. Establish, when in response to determining the UPF is selected and the UPF is an Nth UPF selected by a member in the virtual network group, a group-level fourth reference point corresponding to the virtual network group between each UPF in a first UPF to an (N−1)th UPF, that are selected by members in the virtual network group, and the Nth UPF, N being an integer greater than or equal to 2.

In certain embodiments, when in response to determining the UPF is selected for the first time and the UPF is an Nth UPF selected by a member in the virtual network group, a group-level fourth reference point N19 tunnel corresponding to the virtual network group is established between each UPF in a first UPF to an (N−1)th UPF, that are selected by members in the virtual network group, and the Nth UPF.

In certain embodiments, referring to FIG. 8, when the PSA UPF 2 is a UPF that is selected for the first time by the member D, and the PSA UPF 2 is the second UPF selected by a member in the virtual network group (when or in response to determining that there is already a PSA UPF 1 that is the first UPF selected by a member in the virtual network group), an N19 GTP-U tunnel is established between the PSA UPF 2 and the PSA UPF 1.

Step 1204d2. The SMF configures, for the each UPF in the first UPF to the (N−1)th UPF, a sixth PDR, a sixth FAR, a seventh PDR, and a seventh FAR that are related to the fourth reference point between the each UPF and the Nth UPF.

Step 1204d3. The SMF configures, for the Nth UPF, the sixth PDR, the sixth FAR, the seventh PDR, and the seventh FAR that are related to the fourth reference point between the Nth UPF and the each UPF in the first UPF to the (N−1)th UPF.

Four group-level N4 sessions used by a virtual network group, that is, N4 sessions independent of each UE (when one UE establishes one PDU session, there is one PDU session-level N4 session), are responsible for transmitting a broadcast data packet received from the N6 or the N19 to an internal broadcast interface and forwarding the data transmitted from the internal broadcast interface to a PDR and an FAR of the N6 or the N19. That is, the four N4 sessions are N4 sessions shared by all members in the virtual network group (in terms of function, the four N4 sessions are used by all the members in the virtual network group, but each member does not need to be defined individually).

Figure 17:
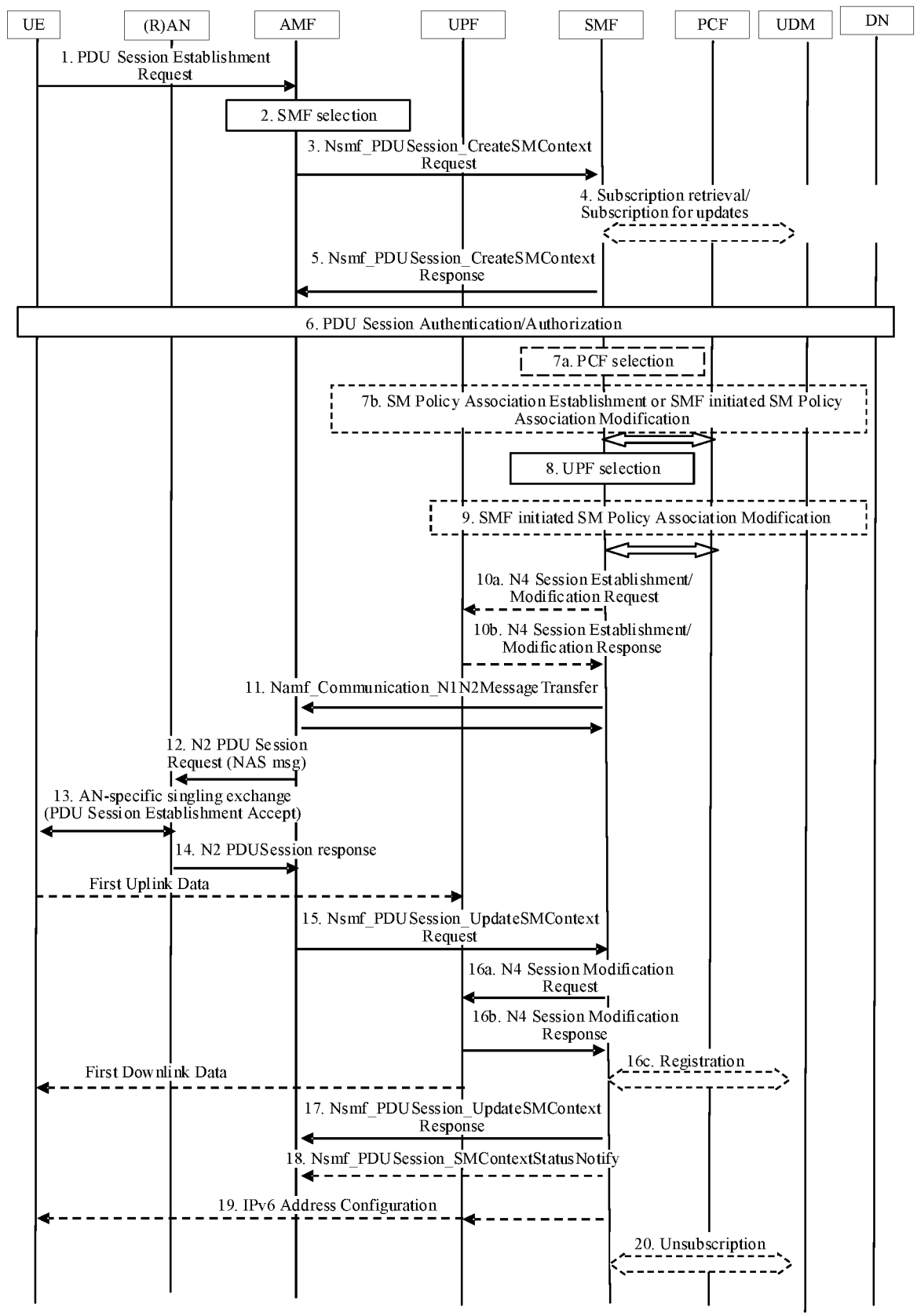
FIG. 17 is a schematic flowchart of establishment of a PDU session requested by UE (which is used in a non-roaming scenario and a roaming with local breakout scenario) according to one or more embodiments of the present disclosure.

In certain embodiments, FIG. 17 is a flowchart of establishment of a PDU session requested by UE (which is used in a non-roaming scenario and a roaming with local breakout scenario). For details related to the accompanying drawing, reference may be made to the description of the accompanying drawing 4.3.2.2.2 in standard 23.502 of 3GPP. Details are not described in the present disclosure.

For the configuration process shown in FIG. 13, each UE in the virtual network group may need to establish a PDU session. For each UE in the virtual network group, the SMF may configure the first PDR, the first FAR, the fourth PDR, the fourth FAR into the UPF in an N4 session establishment process "that is, the SMF transmits an N4 session establishment/modification request to the UPF" in step 10*a*.

For the configuration process shown in FIG. 14, if the UPF is a first UPF that is selected by a member in the virtual network group, the SMF may deliver, for a first selected UPF of each UE, a second PDR, a second FAR, a fifth PDR, and a fifth FAR that are related to a group-level N6 interface corresponding to the virtual network group to the UPF in a "UPF selection" in step 8.

For the configuration process shown in FIG. 15, if the UPF is selected for the first time and is an Nth (N>=2) UPF used by a member in the virtual network group, in the "UPF selection" in step 8, the SMF may establish a group-level N19 interface that is between each selected UPF in a first UPF to an (N−1)th UPF and the Nth UPF and that corresponds to the virtual network group, create a third PDR, a third FAR, a fifth PDR, and a fifth FAR that are related to the N19 interface between the each UPF and the Nth UPF, and deliver these rules to the first UPF to the (N−1)th UPF.

In addition, the SMF creates the third PDR, the third FAR, the fifth PDR, and the fifth FAR that are related to the N19 interface between the Nth selected UPF and the each UPF in the first UPF to the (N−1)th UPF, and delivers these rules to the Nth UPF.

For the configuration process shown in FIG. 16, if the UPF is selected for the first time and is an Nth (N>=2) UPF used by a member in the virtual network group, in the "UPF selection" in step 8, the SMF may establish a group-level N19 interface that is between each selected UPF in a first UPF to an (N−1)th UPF and the Nth UPF and that corresponds to the virtual network group, create a sixth PDR, a sixth FAR, a seventh PDR, and a seventh FAR that are related to the N19 interface between the each UPF and the Nth UPF, and deliver these rules to the first UPF to the (N−1)th UPF.

In addition, the SMF creates the sixth PDR, the sixth FAR, the seventh PDR, and the seventh FAR that are related to the N19 interface between the Nth selected UPF and the each UPF in the first UPF to the (N−1)th UPF, and delivers these rules to the Nth UPF.

For descriptions related to "the first PDR and the first FAR", "the second PDR and the second FAR", "the third PDR and the third FAR", "the fourth PDR and the fourth FAR", "the fifth PDR and the fifth FAR", "the sixth PDR and the sixth FAR", and "the seventh PDR and the seventh FAR", reference may be made to the description in the foregoing embodiments. Details are not described again in this embodiment.

Figure 18:
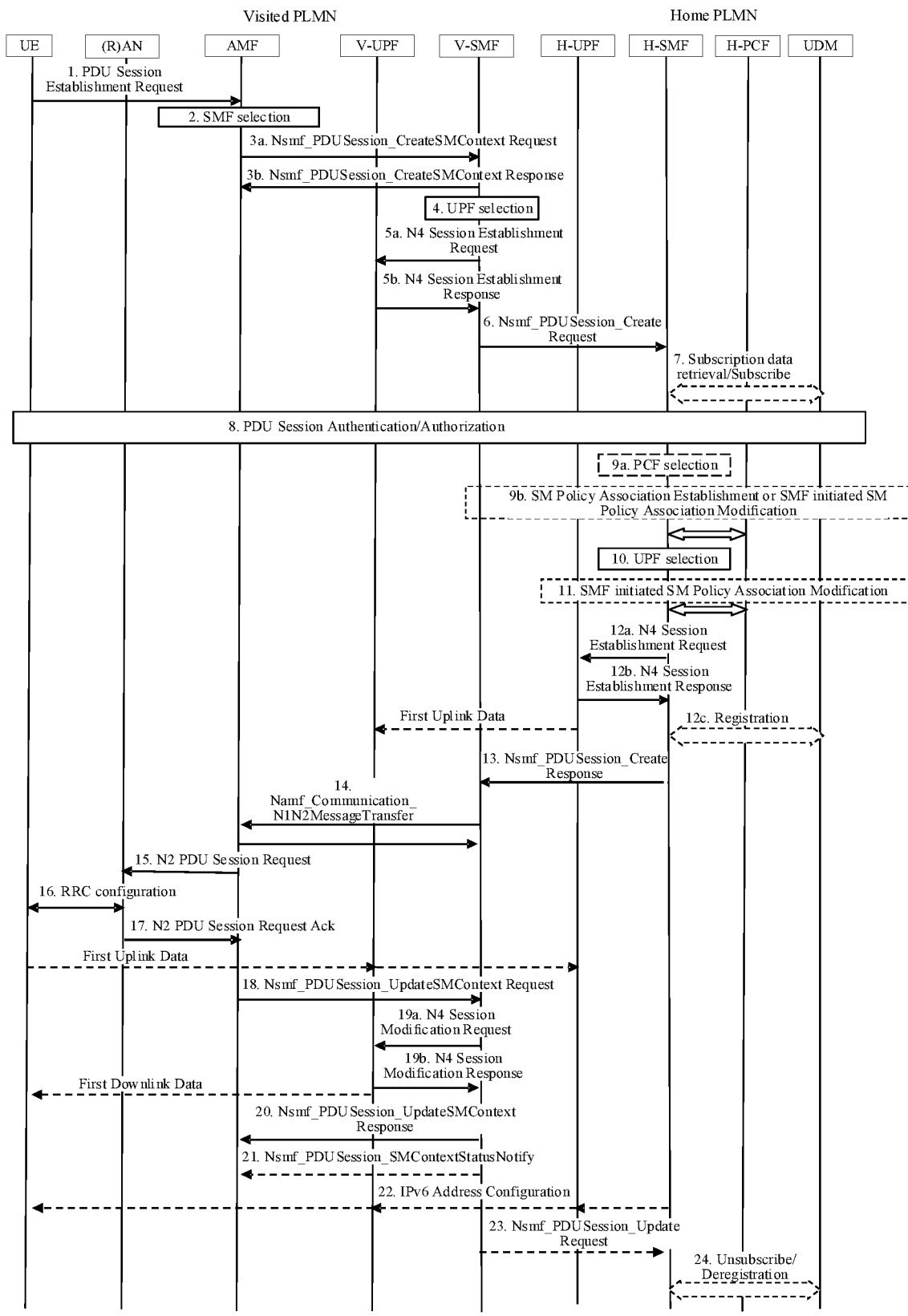
FIG. 18 is a schematic flowchart of establishment of a PDU session requested by UE (which is used in a home-routed roaming scenario) according to one or more embodiments of the present disclosure.

In certain embodiments, FIG. 18 is a flowchart of establishment of a PDU session requested by UE (which is used in a home-routed roaming scenario). The configuration process shown in FIG. 13, FIG. 14, FIG. 15, or FIG. 16 is performed in step 10 of "UPF selection" and step 12*a* "N4 Session Establishment Request" in FIG. 18, instead of being performed in step 4 of "UPF selection" and step 5*a* "N4 Session Establishment Request". For details related to FIG. 18, reference may be made to the description of the accompanying drawing 4.3.2.2.2-1 in standard 23.502 of 3GPP. Details are not described in the present disclosure.

In the foregoing first implementation and the second implementation, the PDRs and the FARs include the broadcast address list. When a change (addition, modification, or deletion) occurs in the broadcast address list, all PDRs and FARs may need to be modified.

There are a plurality of members in a virtual network group, and if only one broadcast address is to be modified, the SMF may need to perform signaling modification on UPFs of all the members because all rules include the broadcast address list, causing large signaling overheads.

Therefore, the foregoing PDRs and FARs may be optimized, and all members and group-level rules share the same broadcast address list. Therefore, the present disclosure proposes that: 1) for members in a virtual network group and group-level PDRs and FARs, all UPFs share the same broadcast address list. 2) When a change (addition, modification, or deletion) occurs in the shared broadcast address list, only the shared broadcast address list may need to be modified for all the UPFs in the virtual network group. When a change (addition, modification, or deletion) occurs in the broadcast address list, all rules of all members in the group are modified, greatly saving signaling.

That is, the method further includes the following steps:

The SMF instructs, when in response to determining a new broadcast address may need to be added to the broadcast address list, any UPF in the different UPFs to add the new broadcast address to the shared address list; or the SMF instructs, when in response to determining a broadcast address in the broadcast address list may need to be modified, any UPF in the different UPFs to modify the broadcast address in the shared address list; or the SMF instructs, when in response to determining a broadcast address in the broadcast address list may need to be deleted, any UPF in the different UPFs to delete the broadcast address from the shared address list.

Figure 19:
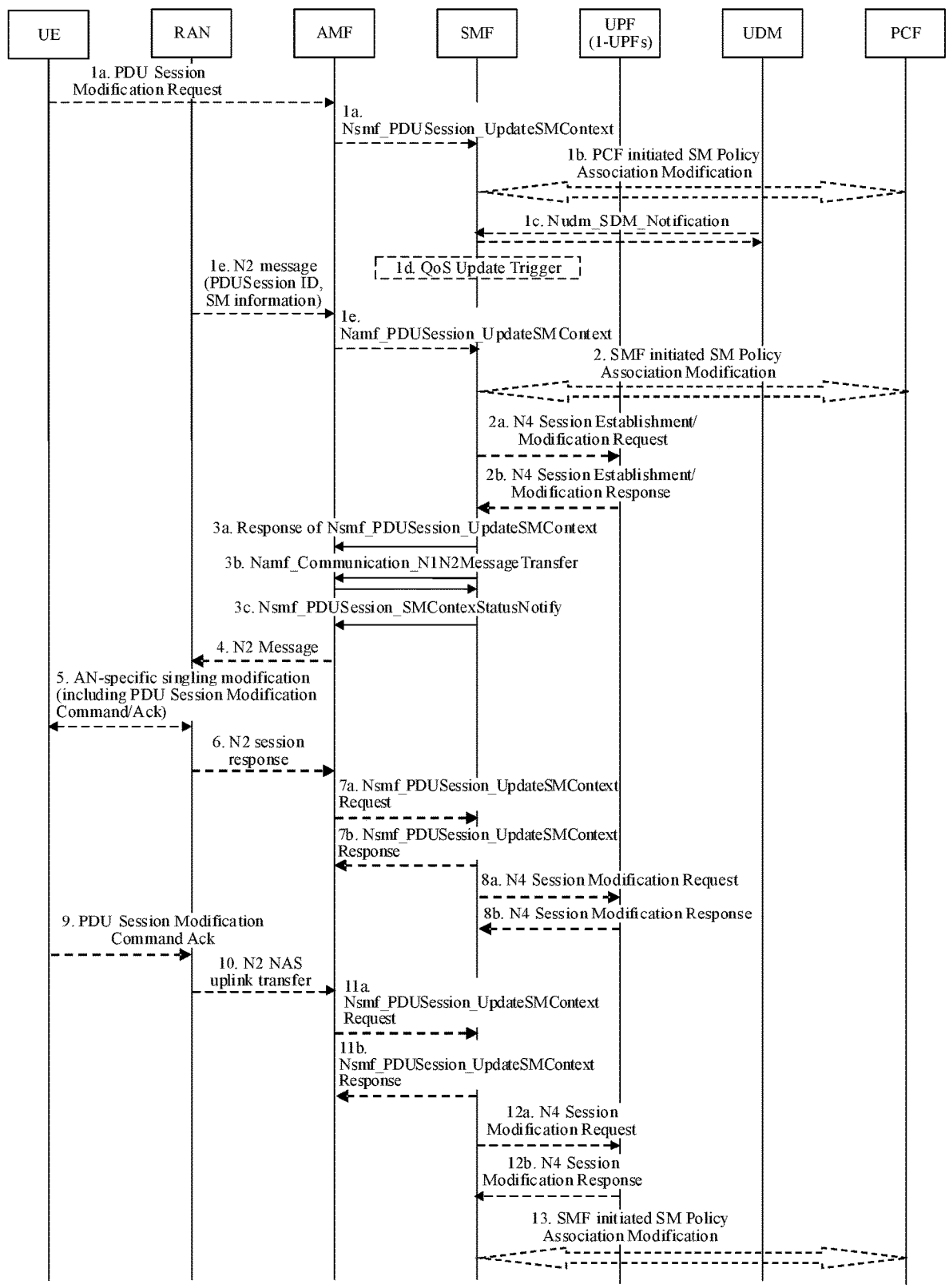
FIG. 19 is a schematic flowchart of modification of a PDU session requested by UE or a network (which is used in a non-roaming scenario and a roaming with local breakout scenario) according to one or more embodiments of the present disclosure.

FIG. 19 is a flowchart of modification of a PDU session requested by UE or a network (which is used in a non-roaming scenario and a roaming with local breakout scenario). The process in which the SMF modifies the broadcast address list may be performed in any step of step 2*a*, step 8*a*, and step 12*a*. For details related to FIG. 19, reference may be made to the description of the accompanying drawing 4.3.2.2.2 in standard 23.502 of 3GPP. Details are not described in the present disclosure.

Figure 20:
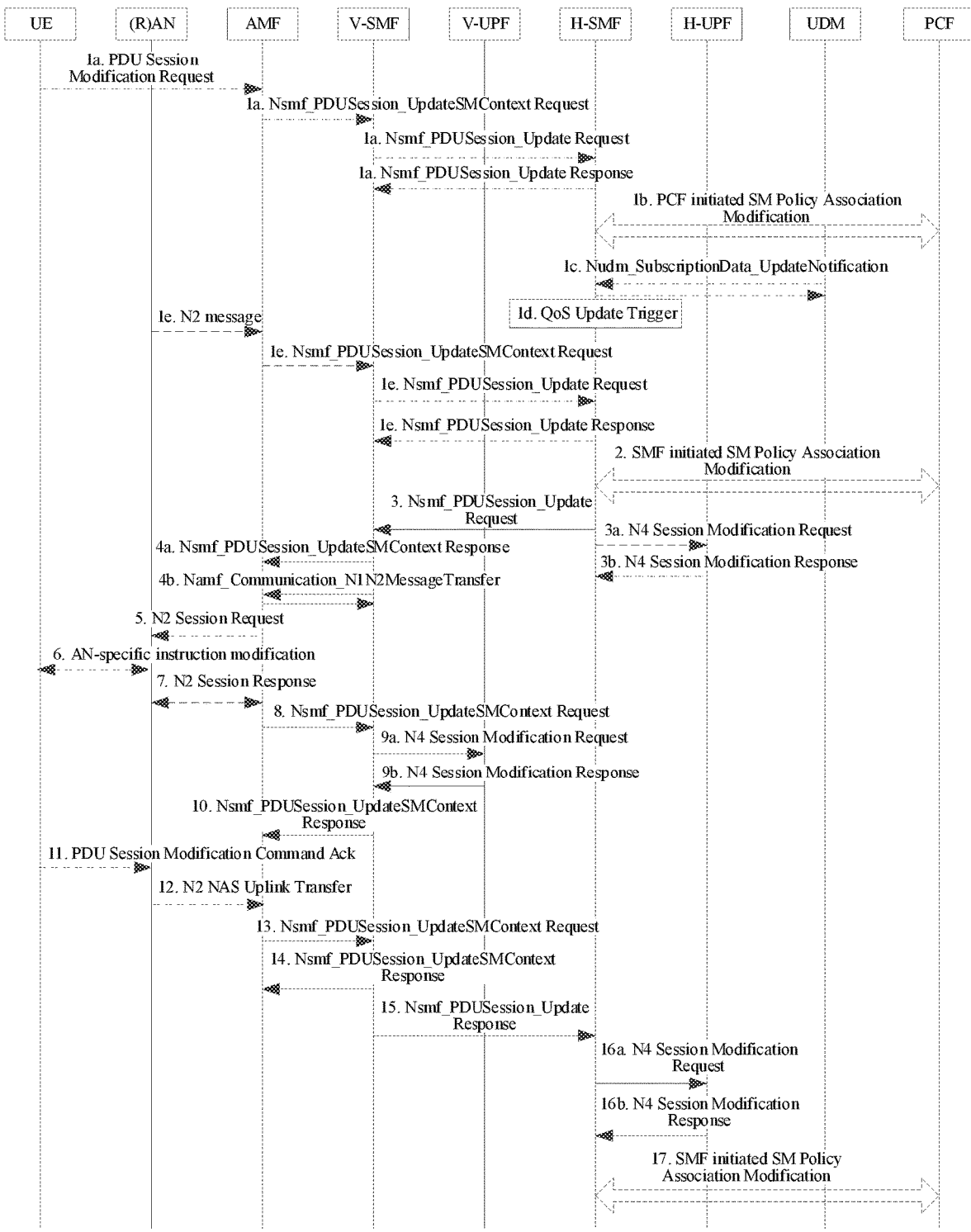
FIG. 20 is a schematic flowchart of modification of a PDU session requested by UE or a network (which is used in a home-routed roaming scenario) according to one or more embodiments of the present disclosure.

FIG. 20 is a flowchart of modification of a PDU session requested by UE or a network (which is used in a home-routed roaming scenario). The process in which the SMF modifies the broadcast address list may be performed in steps between the H-SMF and the H-UPF or in step 16*a*. For details related to FIG. 20, reference may be made to the description of the accompanying drawing 4.3.2.2.2-1 in standard 23.502 of 3GPP. Details are not described in the present disclosure.

For a scenario in which UE moves from a UPF to another UPF.

Figure 21:
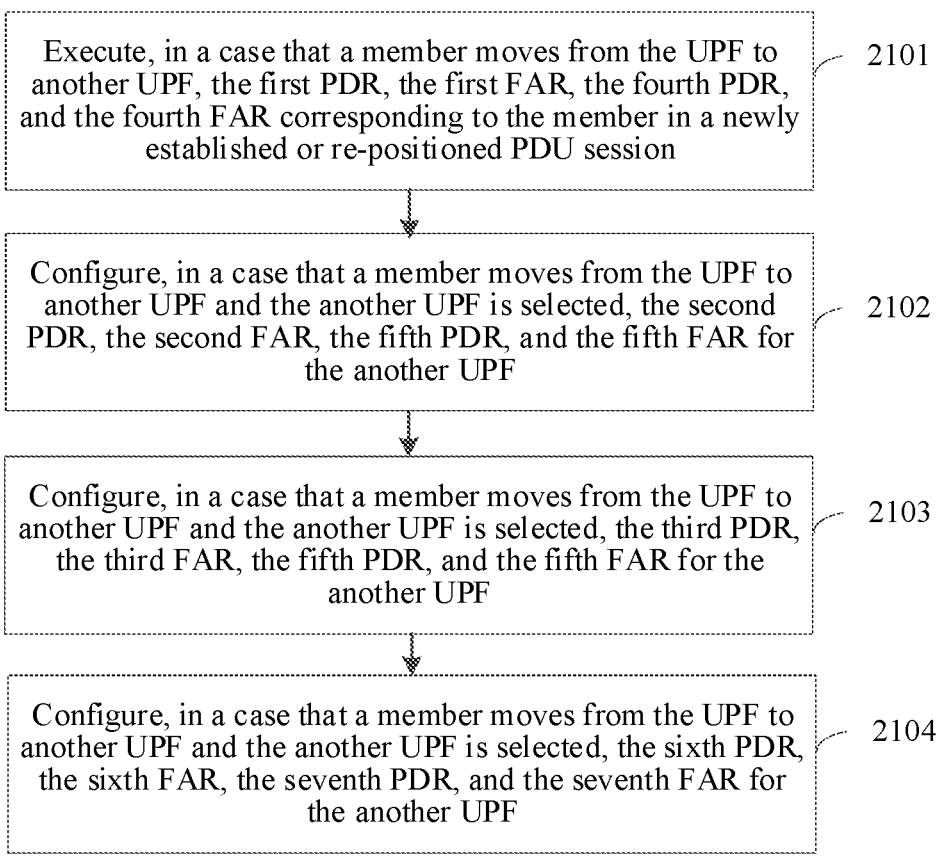
FIG. 21 is a schematic flowchart of a broadcast method for a virtual network group according to one or more embodiments of the present disclosure.

FIG. 21 is a flowchart of a broadcast method for a virtual network group according to another exemplary embodiment of the present disclosure. The method may be performed by an SMF, and include the following steps:

Step 2101. The SMF executes, when in response to determining a member moves from the UPF to another UPF, the first PDR, the first FAR, the fourth PDR, and the fourth FAR corresponding to the member in a newly established or re-positioned PDU session.

When in response to determining the at least two internal broadcast interfaces include a first internal broadcast interface, and a member moves from the UPF to another UPF, the SMF executes the first PDR, the first FAR, the fourth PDR, and the fourth FAR that correspond to the member in a newly established or re-positioned PDU session.

Because all context of the member on the old UPF is deleted, the old UPF further deletes the first PDR, the first FAR, the fourth PDR, and the fourth FAR of the member.

Step 2102. The SW' configures, when in response to determining a member moves from the UPF to another UPF and the another UPF is selected, the second PDR, the second FAR, the fifth PDR, and the fifth FAR for the another UPF.

When in response to determining the at least two internal broadcast interfaces include a second internal broadcast interface, and a member moves from the UPF to another UPF, the SMF configures the group-level second PDR, second FAR, fifth PDR, and fifth FAR for the another UPF.

Because all context of the member on the old UPF is deleted, if the UE is a member in the last virtual network group on the old UPF, the group-level second PDR, second FAR, fifth PDR, and fifth FAR on the old UPF are deleted.

Step 2103. The SW' configures, when in response to determining a member moves from the UPF to another UPF and the another UPF is selected, the third PDR, the third FAR, the fifth PDR, and the fifth FAR for the another UPF.

When in response to determining the at least two internal broadcast interfaces include a second internal broadcast interface, and a member moves from the UPF to another UPF, the SMF configures the group-level third PDR, third FAR, fifth PDR, and fifth FAR for the another UPF.

In certain embodiments, the SMF configures, when in response to determining a member moves from the UPF to another UPF and the another UPF is selected for the first time, the group-level third PDR, third FAR, fifth PDR, and fifth FAR for the another UPF.

Because all context of the member on the old UPF is deleted, if the UE is a member in the last virtual network group on the old UPF, the group-level third PDR, third FAR, fifth PDR, and fifth FAR on the old UPF are deleted.

Step 2104. The SMF configures, when in response to determining a member moves from the UPF to another UPF and the another UPF is selected, the sixth PDR, the sixth FAR, the seventh PDR, and the seventh FAR for the another UPF.

When in response to determining the at least two internal broadcast interfaces include a third internal broadcast interface, and a member moves from the UPF to another UPF, the SMF configures the group-level sixth PDR, sixth FAR, seventh PDR, and seventh FAR for the another UPF.

In certain embodiments, the SMF configures, when in response to determining a member moves from the UPF to another UPF and the another UPF is selected for the first time, the group-level sixth PDR, sixth FAR, seventh PDR, and seventh FAR for the another UPF.

Because all context of the member on the old UPF is deleted, if the UE is a member in the last virtual network group on the old UPF, the group-level sixth PDR, sixth FAR, seventh PDR, and seventh FAR on the old UPF are deleted.

An execution sequence of the foregoing four steps is not limited, and each step may be performed independent of each other. This is not limited in the embodiments of the present disclosure.

For descriptions related to "the first PDR and the first FAR", "the second PDR and the second FAR", "the third PDR and the third FAR", "the fourth PDR and the fourth FAR", "the fifth PDR and the fifth FAR", "the sixth PDR and the sixth FAR", and "the seventh PDR and the seventh FAR", reference may be made to the description in the foregoing embodiments. Details are not described again in this embodiment.

Apparatus embodiments of the present disclosure are described below. For details that are not described in detail in the apparatus embodiments, reference may be made to the foregoing method embodiments.

Figure 22:
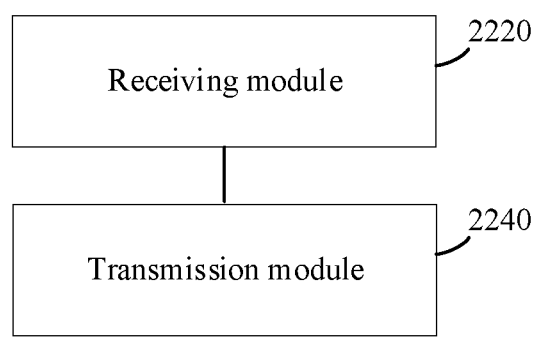
FIG. 22 is a schematic structural diagram of a broadcast apparatus for a virtual network group according to one or more embodiments of the present disclosure.

FIG. 22 is a block diagram of a broadcast apparatus for a virtual network group according to an exemplary embodiment of the present disclosure. The apparatus may be implemented as a part of a UPF. The apparatus includes: a receiving module 2220, configured to receive a broadcast data packet transmitted by a member in a virtual network group, a target address of the broadcast data packet being a broadcast address; and a transmission module 2240, configured to transmit the broadcast data packet to a target internal broadcast interface in at least two internal broadcast interfaces, and transmit the broadcast data packet to all members or all local members in the virtual network group by using the target internal broadcast interface.

In certain embodiments, the at least two internal broadcast interfaces include: a first internal broadcast interface and a second internal broadcast interface.

The transmission module 2240 is configured to transmit the broadcast data packet to the first internal broadcast interface when in response to determining the broadcast data packet is broadcast data from a first reference point or a second reference point, and transmit, by using the first internal broadcast interface, the broadcast data packet to all the members in the virtual network group by using the first reference point, the second reference point, a third reference point, or a fourth reference point respectively corresponding to each member in the virtual network group; or the transmission module 2240 is configured to transmit the broadcast data packet to the second internal broadcast interface when in response to determining the broadcast data packet is broadcast data from the third reference point or the fourth reference point, and transmit, by using the second internal broadcast interface, the broadcast data packet to all the local members of the UPF by using the first reference point or the second reference point respectively corresponding to each local member of the UPF, the first reference point being a reference point between an access network and the UPF, the second reference point being a reference point between the UPF and another UPF, the third reference point being a reference point between the UPF and a DN, and the fourth reference point being a reference point between the UPF and another PSA UPF.

In certain embodiments, the at least two internal broadcast interfaces include: a first internal broadcast interface, a second internal broadcast interface, and a third internal broadcast interface.

The transmission module 2240 is configured to transmit the broadcast data packet to the first internal broadcast interface when in response to determining the broadcast data packet is broadcast data from a first reference point or a second reference point, and transmit, by using the first internal broadcast interface, the broadcast data packet to all the members or all the local members in the virtual network group by using the first reference point, the second reference point, a third reference point, or a fourth reference point respectively corresponding to each member in the virtual network group; the transmission module 2240 is configured to transmit the broadcast data packet to the second internal broadcast interface when in response to determining the broadcast data packet is broadcast data from the third reference point, and transmit, by using the second internal broadcast interface, the broadcast data packet to all the local members of the UPF by using the first reference point or the second reference point respectively corresponding to each local member of the UPF; or the transmission module 2240 is configured to transmit the broadcast data packet to the third internal broadcast interface when in response to determining the broadcast data packet is broadcast data from the fourth reference point, and transmit, by using the third internal broadcast interface, the broadcast data packet to all the local members of the UPF by using the first reference point or the second reference point respectively corresponding to each local member of the UPF in the virtual network group, the first reference point being a reference point between an access network and the UPF, the second reference point being a reference point between the UPF and another UPF, the third reference point being a reference point between the UPF and a DN, and the fourth reference point being a reference point between the UPF and another PSA UPF.

In certain embodiments, the UPF is provided with a first PDR and a first FAR corresponding to the local members.

The transmission module 2240 is configured to transmit, when in response to determining it is detected, by using the first PDR, that the broadcast data packet is broadcast data from the first reference point or the second reference point, the broadcast data packet to the first internal broadcast interface by using the first FAR.

In certain embodiments, there is one first internal broadcast interface, and the first PDR includes that: a source interface is set as an access side, a target address is set as a broadcast address list, and core network tunnel information is set as a tunnel header of a first reference point or a second reference point of a PDU session; and the first FAR includes that: a target interface is set as the first internal broadcast interface; or there are m first internal broadcast interfaces, an ith first internal broadcast interface corresponds to an ith broadcast address, the ith broadcast address is a broadcast address in the broadcast data packet, and the first PDR includes that: a source interface is set as an access side, a target address is set as the ith broadcast address, and core network tunnel information is set as a tunnel header of a first reference point or a second reference point of a PDU session; and the first FAR includes that: a target interface is set as the ith first internal broadcast interface, m being a positive integer, and i being an integer not greater than m.

In certain embodiments, the UPF is provided with a second PDR and a second FAR that correspond to a group-level session, the group-level session being a session shared by members in the virtual network group, and a session between the UPF and an SMF.

The transmission module 2240 is configured to transmit, when in response to determining it is detected, by using the second PDR, that the broadcast data packet is broadcast data from the third reference point, the broadcast data packet to the second internal broadcast interface by using the second FAR.

In certain embodiments, there is one second internal broadcast interface, and the second PDR includes that: a source interface is set as a core side, and a target address is set as a broadcast address list; and the second FAR includes that: a target interface is set as the second internal broadcast interface; or there are m second internal broadcast interfaces, an ith second internal broadcast interface corresponds to an ith broadcast address, the ith broadcast address is a broadcast address in the broadcast data packet, and the second PDR includes that: a source interface is set as a core side, and a target address is set as the ith broadcast address; and the second FAR includes that: a target interface is set as the ith second internal broadcast interface, m being a positive integer, and i being an integer not greater than m.

In certain embodiments, the UPF is provided with a third PDR and a third FAR that correspond to a group-level session, the group-level session being a session shared by members in the virtual network group, and a session between the UPF and an SMF.

The transmission module 2240 is configured to transmit, when in response to determining it is detected, by using the third PDR, that the broadcast data packet is broadcast data from the fourth reference point, the broadcast data packet to the second internal broadcast interface by using the third FAR.

In certain embodiments, there is one second internal broadcast interface, and the third PDR includes that: a source interface is set as a core side, a target address is set as a broadcast address list, and core network tunnel information is set as a tunnel header of the fourth reference point; and the third FAR includes that: a target interface is set as the second internal broadcast interface; or there are m second internal broadcast interfaces, an ith second internal broadcast interface corresponds to an ith broadcast address, the ith broadcast address is a broadcast address in the broadcast data packet, and the third PDR includes that: a source interface is set as a core side, a target address is set as the ith broadcast address, and core network tunnel information is set as a tunnel header of the fourth reference point; and the third FAR includes that: a target interface is set as the ith second internal broadcast interface, m being a positive integer, and i being an integer not greater than m.

In certain embodiments, the UPF is provided with a fourth PDR and a fourth FAR that correspond to members in the virtual network group.

The transmission module 2240 is configured to transmit, when in response to determining it is detected, by using the fourth PDR, that the broadcast data packet is broadcast data from the first internal broadcast interface, the broadcast data packet to all the members in the virtual network group by using the first reference point, the second reference point, the third reference point, or the fourth reference point respectively corresponding to each member in the virtual network group by using the fourth FAR.

In certain embodiments, there is one first internal broadcast interface, and the fourth PDR includes that: a source interface is set as the first internal broadcast interface, and a target address is set as a broadcast address list; and the fourth FAR includes that: an external header creates tunnel information indicating the first reference point or the second reference point, and a target interface is an access side; or the fourth FAR further includes that: an external header creates information indicating the third reference point, and a target interface is a core side; or the fourth FAR further includes that: an external header creates tunnel information indicating the fourth reference point, and a target interface is a core side; or there are m first internal broadcast interfaces, an ith first internal broadcast interface corresponds to an ith broadcast address, and the ith broadcast address is a broadcast address in the broadcast data packet; the fourth PDR includes that: a source interface is set as the ith first internal broadcast interface, and a target address is set as the ith broadcast address; and the fourth FAR includes that: an external header creates tunnel information indicating the first reference point or the second reference point, and a target interface is an access side; or the fourth FAR further includes that: an external header creates information indicating the third reference point, and a target interface is a core side; or the fourth FAR further includes that: an external header creates tunnel information indicating the fourth reference point, and a target interface is a core side.

m is a positive integer, and i is an integer not greater than m.

In certain embodiments, the UPF is provided with a fifth PDR and a fifth FAR that correspond to a group-level session, the group-level session being a session shared by members in the virtual network group, and a session between the UPF and an SMF.

The transmission module 2240 is configured to transmit, when in response to determining it is detected, by using the fifth PDR, that the broadcast data packet is broadcast data from the second internal broadcast interface, the broadcast data packet to all the local members of the UPF by using the first reference point or the second reference point respectively corresponding to each local member of the UPF by using the fifth FAR.

In certain embodiments, there is one second internal broadcast interface, and the fifth PDR includes that: a source interface is set as the second internal broadcast interface, and a target address is set as a broadcast address list; and the fifth FAR includes that: an external header creates tunnel information indicating the first reference point or the second reference point, and a target interface is an access side; or there are m second internal broadcast interfaces, an ith second internal broadcast interface corresponds to an ith broadcast address, the ith broadcast address is a broadcast address in the broadcast data packet, and the fifth PDR includes that: a source interface is set as the ith second internal broadcast interface, and a target address is set as the ith broadcast address; and the fifth FAR includes that: an external header creates tunnel information indicating the first reference point or the second reference point, and a target interface is an access side, m being a positive integer, and i being an integer not greater than m.

In certain embodiments, the UPF is provided with a sixth PDR and a sixth FAR that correspond to a group-level session, the group-level session being a session shared by members in the virtual network group, and a session between the UPF and an SMF.

The transmission module 2240 is configured to transmit, when in response to determining it is detected, by using the sixth PDR, that the broadcast data packet is broadcast data from the fourth reference point, the broadcast data packet to the third internal broadcast interface by using the sixth FAR.

In certain embodiments, there is one third internal broadcast interface, and the sixth PDR includes that: a source interface is set as a core side, a target address is set as a broadcast address list, and core network tunnel information is set as a tunnel header of the fourth reference point; and the sixth FAR includes that: a target interface is set as the third internal broadcast interface; or there are m third internal broadcast interfaces, an ith third internal broadcast interface corresponds to an ith broadcast address, the ith broadcast address is a broadcast address in the broadcast data packet, and the sixth PDR includes that: a source interface is set as a core side, a target address is set as the ith broadcast address, and core network tunnel information is set as a tunnel header of the fourth reference point; and the sixth FAR includes that: a target interface is set as the ith third internal broadcast interface, m being a positive integer, and i being an integer not greater than m.

In certain embodiments, the UPF is provided with a seventh PDR and a seventh FAR that correspond to a group-level session, the group-level session being a session shared by members in the virtual network group, and a session between the UPF and an SMF.

The transmission module 2240 is configured to transmit, when in response to determining it is detected, by using the seventh PDR, that the broadcast data packet is broadcast data from the third internal broadcast interface, the broadcast data packet to all the local members of the UPF by using the first reference point or the second reference point respectively corresponding to each local member of the UPF in the virtual network group by using the seventh FAR.

In certain embodiments, there is one third internal broadcast interface, and the seventh PDR includes that: a source interface is set as the third internal broadcast interface, and a target address is set as a broadcast address list; and the seventh FAR includes that: an external header creates tunnel information indicating the first reference point or the second reference point, and a target interface is an access side; or there are m third internal broadcast interfaces, an ith third internal broadcast interface corresponds to an ith broadcast address, the ith broadcast address is a broadcast address in the broadcast data packet, and the seventh PDR includes that: a source interface is set as the ith third internal broadcast interface, and a target address is set as the ith broadcast address; and the seventh FAR includes that: an external header creates tunnel information indicating the first reference point or the second reference point, and a target interface is an access side, m being a positive integer, and i being an integer not greater than m.

In certain embodiments, the at least two internal broadcast interfaces include: a first internal broadcast interface and m second internal broadcast interfaces, each second internal broadcast interface being corresponding to one broadcast address, and m being a quantity of broadcast addresses.

The transmission module 2240 is configured to transmit the broadcast data packet to the first internal broadcast interface when in response to determining the broadcast data packet is broadcast data from a first reference point or a second reference point, and transmit, by using the first internal broadcast interface, the broadcast data packet to all the members in the virtual network group by using the first reference point, the second reference point, a third reference point, or a fourth reference point respectively corresponding to each member in the virtual network group; or the transmission module 2240 is configured to transmit, when in response to determining the broadcast data packet is broadcast data from the third reference point or the fourth reference point, and a broadcast address of the broadcast data packet is an ith broadcast address, the broadcast data packet to the second internal broadcast interface corresponding to the ith broadcast address, and transmit, by using the second internal broadcast interface corresponding to the ith broadcast address, the broadcast data packet to all the local members of the UPF by using the first reference point or the second reference point respectively corresponding to each local member of the UPF, the first reference point being a reference point between an access network and the UPF, the second reference point being a reference point between the UPF and another UPF, the third reference point being a reference point between the UPF and a DN, the fourth reference point being a reference point between the UPF and another PSA UPF, m and i being positive integers, and i being not greater than m.

Figure 23:
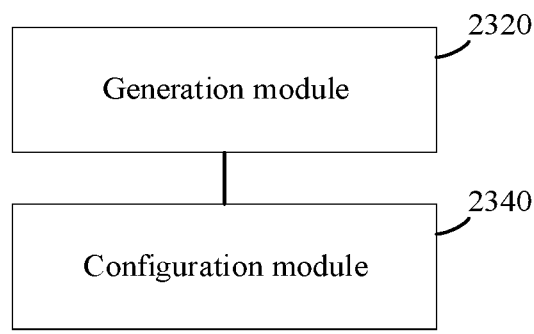
FIG. 23 is a schematic structural diagram of a broadcast apparatus for a virtual network group according to one or more embodiments of the present disclosure.

FIG. 23 is a block diagram of a broadcast apparatus for a virtual network group according to an exemplary embodiment of the present disclosure. The apparatus may be implemented as a part of an SMF. The apparatus includes: a generation module 2320, configured to generate a PDR and an FAR; and a configuration module 2340, configured to configure the PDR and the FAR for a UPF corresponding to each member in a virtual network group, the PDR and the FAR being used by the UPF to receive a broadcast data packet transmitted by a member in the virtual network group, a target address of the broadcast data packet being a broadcast address; and transmit the broadcast data packet to a target internal broadcast interface in at least two internal broadcast interfaces, and transmit the broadcast data packet to all members or all local members in the virtual network group by using the target internal broadcast interface.

In certain embodiments, the at least two internal broadcast interfaces include a first internal broadcast interface. The configuration module 2340 is configured to configure, in a process in which each member in the virtual network group establishes a PDU session, a first PDR, a first FAR, a fourth PDR, and a fourth FAR that correspond to the each member for the UPF corresponding to the each member.

In certain embodiments, there is one first internal broadcast interface, and the first PDR includes that: a source interface is set as an access side, a target address is set as a broadcast address list, and core network tunnel information is set as a tunnel header of a first reference point or a second reference point of a PDU session; the first FAR includes that: a target interface is set as the first internal broadcast interface; the fourth PDR includes that: a source interface is set as the first internal broadcast interface, and a target address is set as the broadcast address list; and the fourth FAR includes that: an external header creates tunnel information indicating the first reference point or the second reference point, and a target interface is the access side; or the fourth FAR further includes that: an external header creates information indicating a third reference point, and a target interface is a core side; or the fourth FAR further includes that: an external header creates tunnel information indicating a fourth reference point, and a target interface is a core side; or there are m first internal broadcast interfaces, an ith first internal broadcast interface corresponds to an ith broadcast address, the ith broadcast address is a broadcast address in the broadcast data packet, and the first PDR includes that: a source interface is set as an access side, a target address is set as the ith broadcast address, and core network tunnel information is set as a tunnel header of a first reference point or a second reference point of a PDU session; the first FAR includes that: a target interface is set as the ith first internal broadcast interface, m being a positive integer, and i being an integer not greater than m; the fourth PDR includes that: a source interface is set as the ith first internal broadcast interface, and a target address is set as the ith broadcast address; and the fourth FAR includes that: an external header creates tunnel information indicating the first reference point or the second reference point, and a target interface is the access side; or the fourth FAR further includes that: an external header creates information indicating a third reference point, and a target interface is a core side; or the fourth FAR further includes that: an external header creates tunnel information indicating a fourth reference point, and a target interface is a core side, the first reference point being a reference point between an access network and the UPF, the second reference point being a reference point between the UPF and another UPF, the third reference point being a reference point between the UPF and a DN, and the fourth reference point being a reference point between the UPF and another PSA UPF.

In certain embodiments, the at least two internal broadcast interfaces include a second internal broadcast interface.

The configuration module 2340 is configured to configure, when in response to determining the UPF is a UPF selected by a member in the virtual network group, a second PDR, a second FAR, a fifth PDR, and a fifth FAR for the UPF.

In certain embodiments, there is one second internal broadcast interface, and the second PDR includes that: a source interface is set as a core side, and a target address is set as a broadcast address list; the second FAR includes that: a target interface is set as the second internal broadcast interface; the fifth PDR includes that: a source interface is set as the second internal broadcast interface, and a target address is set as the broadcast address list; and the fifth FAR includes that: an external header creates tunnel information indicating a first reference point or a second reference point, and a target interface is an access side; or there are m second internal broadcast interfaces, an ith second internal broadcast interface corresponds to an ith broadcast address, the ith broadcast address is a broadcast address in the broadcast data packet, and the second PDR includes that: a source interface is set as a core side, and a target address is set as the ith broadcast address; the second FAR includes that: a target interface is set as the ith second internal broadcast interface; the fifth PDR includes that: a source interface is set as the ith second internal broadcast interface, and a target address is set as the ith broadcast address; and the fifth FAR includes that: an external header creates tunnel information indicating a first reference point or a second reference point, and a target interface is an access side, m being a positive integer, and i being an integer not greater than m, the first reference point being a reference point between an access network and the UPF, and the second reference point being a reference point between the UPF and another UPF.

In certain embodiments, the at least two internal broadcast interfaces include a second internal broadcast interface.

The configuration module 2340 is configured to establish, when in response to determining the UPF is selected and the UPF is an Nth UPF selected by a member in the virtual network group, a group-level fourth reference point corresponding to the virtual network group between each UPF in a first UPF to an (N−1)th UPF, that are selected by members in the virtual network group, and the Nth UPF, N being an integer greater than or equal to 2; configure, for the each UPF in the first UPF to the (N−1)th UPF, a third PDR, a third FAR, a fifth PDR, and a fifth FAR that are related to the fourth reference point between the each UPF and the Nth UPF; and configure, for the Nth UPF, the third PDR, the third FAR, the fifth PDR, and the fifth FAR that are related to the fourth reference point between the Nth UPF and the each UPF in the first UPF to the (N−1)th UPF.

In certain embodiments, there is one second internal broadcast interface, and the third PDR includes that: a source interface is set as a core side, a target address is set as a broadcast address list, and core network tunnel information is set as a tunnel header of the fourth reference point; the third FAR includes that: a target interface is set as the second internal broadcast interface; the fifth PDR includes that: a source interface is set as the second internal broadcast interface, and a target address is set as the broadcast address list; and the fifth FAR includes that: an external header creates tunnel information indicating a first reference point or a second reference point, and a target interface is an access side; or there are m second internal broadcast interfaces, an ith second internal broadcast interface corresponds to an ith broadcast address, the ith broadcast address is a broadcast address in the broadcast data packet, and the third PDR includes that: a source interface is set as a core side, a target address is set as the ith broadcast address, and core network tunnel information is set as a tunnel header of the fourth reference point; the third FAR includes that: a target interface is set as the ith second internal broadcast interface; the fifth PDR includes that: a source interface is set as the ith second internal broadcast interface, and a target address is set as the ith broadcast address; and the fifth FAR includes that: an external header creates tunnel information indicating a first reference point or a second reference point, and a target interface is an access side, m being a positive integer, and i being an integer not greater than m, the first reference point being a reference point between an access network and the UPF, and the second reference point being a reference point between the UPF and another UPF.

In certain embodiments, the at least two internal broadcast interfaces include a third internal broadcast interface.

The configuration module 2340 is configured to establish, when in response to determining the UPF is selected and the UPF is an Nth UPF selected by a member in the virtual network group, a group-level fourth reference point corresponding to the virtual network group between each UPF in a first UPF to an (N−1)th UPF, that are selected by members in the virtual network group, and the Nth UPF, N being an integer greater than or equal to 2; configure, for the each UPF in the first UPF to the (N−1)th UPF, a sixth PDR, a sixth FAR, a seventh PDR, and a seventh FAR that are related to the fourth reference point between the each UPF and the Nth UPF; and configure, for the Nth UPF, the sixth PDR, the sixth FAR, the seventh PDR, and the seventh FAR that are related to the fourth reference point between the Nth UPF and the each UPF in the first UPF to the (N−1)th UPF.

In certain embodiments, there is one third internal broadcast interface, and the sixth PDR includes that: a source interface is set as a core side, a target address is set as a broadcast address list, and core network tunnel information is set as a tunnel header of the fourth reference point; the sixth FAR includes that: a target interface is set as the third internal broadcast interface; the seventh PDR includes that: a source interface is set as the third internal broadcast interface, and a target address is set as the broadcast address list; and the seventh FAR includes that: an external header creates tunnel information indicating a first reference point or a second reference point, and a target interface is an access side; or there are m third internal broadcast interfaces, an ith third internal broadcast interface corresponds to an ith broadcast address, the ith broadcast address is a broadcast address in the broadcast data packet, and the sixth PDR includes that: a source interface is set as a core side, a target address is set as the ith broadcast address, and core network tunnel information is set as a tunnel header of the fourth reference point; the sixth FAR includes that: a target interface is set as the ith third internal broadcast interface; the seventh PDR includes that: a source interface is set as the ith third internal broadcast interface, and a target address is set as the ith broadcast address; and the seventh FAR includes that: an external header creates tunnel information indicating a first reference point or a second reference point, and a target interface is an access side, m being a positive integer, and i being an integer not greater than m; and the first reference point being a reference point between an access network and the UPF, and the second reference point being a reference point between the UPF and another UPF.

In certain embodiments, the broadcast address list in PDRs and FARs on different UPFs is a shared address list.

The configuration module 2340 is configured to instruct, when in response to determining a new broadcast address may need to be added to the broadcast address list, any UPF in the different UPFs to add the new broadcast address to the shared address list; or the configuration module 2340 is configured to instruct, when in response to determining a broadcast address in the broadcast address list may need to be modified, any UPF in the different UPFs to modify the broadcast address in the shared address list; or the configuration module 2340 is configured to instruct, when in response to determining a broadcast address in the broadcast address list may need to be deleted, any UPF in the different UPFs to delete the broadcast address from the shared address list.

In certain embodiments, the configuration module 2340 is configured to execute, when in response to determining a member moves from the UPF to another UPF, the first PDR, the first FAR, the fourth PDR, and the fourth FAR that correspond to the member in a newly established or re-positioned PDU session.

In certain embodiments, the configuration module 2340 is configured to configure, when in response to determining a member moves from the UPF to another UPF and the another UPF is selected, the second PDR, the second FAR, the fifth PDR, and the fifth FAR for the another UPF.

In certain embodiments, the configuration module 2340 is configured to configure, when in response to determining a member moves from the UPF to another UPF and the another UPF is selected, the third PDR, the third FAR, the fifth PDR, and the fifth FAR for the another UPF.

In certain embodiments, the configuration module 2340 is configured to configure, when in response to determining a member moves from the UPF to another UPF and the another UPF is selected, the sixth PDR, the sixth FAR, the seventh PDR, and the seventh FAR for the another UPF.

Figure 24:
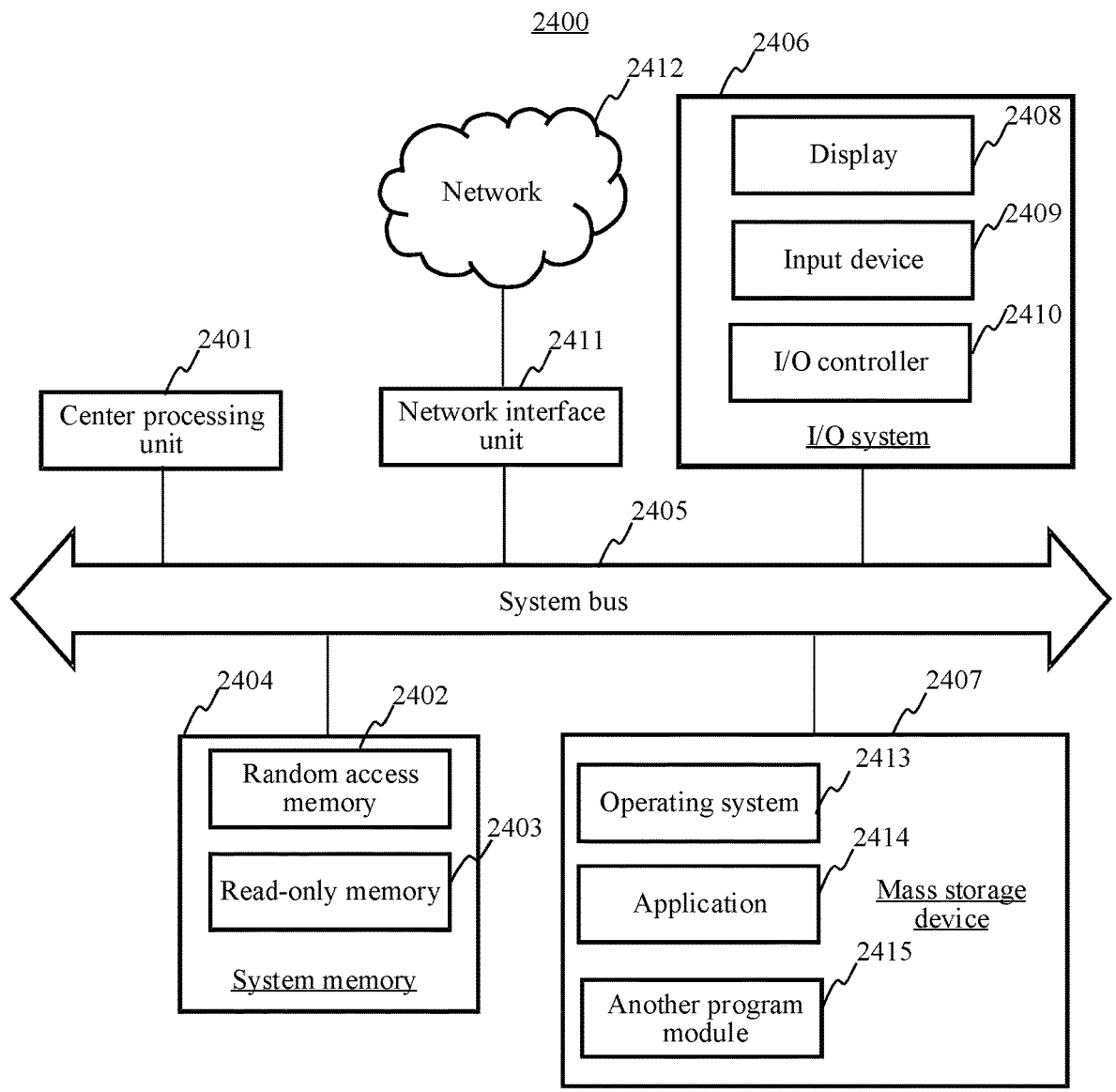
FIG. 24 is a schematic block diagram of a computer device according to one or more embodiments of the present disclosure.

FIG. 24 is a block diagram of a computer device according to an exemplary embodiment of the present disclosure. In certain embodiments, the computer device 2400 includes a central processing unit (CPU) 2401, a system memory 2404 including a random access memory (RAM) 2402 and a read-only memory (ROM) 2403, and a system bus 2405 connecting the system memory 2404 and the CPU 2401. The computer device 2400 further includes a basic input/output (I/O) system 2406 assisting in transmitting information between components in a computer, and a mass storage device 2407 configured to store an operating system 2413, an application 2414, and another program module 2415.

The basic I/O system 2406 includes a display 2408 configured to display information and an input device 2409 such as a mouse or a keyboard that is configured to input information by a user. The display 2408 and the input device 2409 are both connected to the CPU 2401 by using an I/O controller 2410 connected to the system bus 2405. The basic I/O system 2406 may further include the I/O controller 2410, to receive and process inputs from a plurality of other devices, such as the keyboard, the mouse, or an electronic stylus. Similarly, the I/O controller 2410 further provides an output to a display screen, a printer, or another type of output device.

The mass storage device 2407 is connected to the CPU 2401 by using a mass storage controller (not shown) connected to the system bus 2405. The mass storage device 2407 and an associated computer-readable medium provide non-volatile storage for the computer device 2400. That is, the mass storage device 2407 may include a computer-readable medium (not shown), such as a hard disk or a CD-ROM drive.

Without loss of generality, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer-storage medium includes a RAM, a ROM, an erasable programmable ROM (EPROM), an electrically erasable programmable ROM (EEPROM), a flash memory or another solid-state storage technology, a CD-ROM, a DVD or another optical storage, a magnetic cassette, a magnetic tape, or a magnetic disk storage or another magnetic storage device. In certain embodiments, a person skilled in the art may learn that the computer storage medium is not limited to the foregoing several types. The system memory 2404 and the mass storage device 2407 may be collectively referred to as a memory.

The memory stores one or more programs, and the one or more programs are configured to be executed by one or more CPUs 2401. The one or more programs include instructions used for implementing the foregoing broadcast method for a virtual network group, and the CPU 2401 executes the one or more programs to implement the broadcast method for a virtual network group provided in the foregoing method embodiments.

According to the embodiments of the present disclosure, the computer device 2400 may further be connected, through a network such as the Internet, to a remote computer on the network and run. That is, the computer device 2400 may be connected to a network 2412 by using a network interface unit 2411 connected to the system bus 2405, or may be connected to another type of network or a remote computer system (not shown) by using a network interface unit 2411.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In certain embodiments, a UPF is run on the computer device, and the computer device includes: a processor and a memory, the memory storing a computer program, the computer program being loaded and executed by the processor to implement the broadcast method for a virtual network group according to the foregoing aspect.

In certain embodiments, an SMF is run on the computer device, and the computer device includes: a processor and a memory, the memory storing a computer program, the computer program being loaded and executed by the processor to implement the broadcast method for a virtual network group according to the foregoing aspect.

According to another aspect of the present disclosure, a computer-readable storage medium is provided. The computer-readable storage medium stores at least one instruction, at least one program, a code set, or an instruction set, the at least one instruction, the at least one program, the code set, or the instruction set being loaded and executed by a processor to implement the broadcast method for a virtual network group according to the foregoing aspect.

According to another aspect of the present disclosure, a computer program product is provided. The computer program product stores at least one instruction, at least one program, a code set, or an instruction set, the at least one instruction, the at least one program, the code set, or the instruction set being loaded and executed by a processor to implement the broadcast method for a virtual network group according to the foregoing aspect.

"Plurality of" mentioned in the present disclosure means two or more. "And/or" describes an association relationship for describing associated objects and represents that three relationships may exist. For example, A and/or B may represent the following three scenarios: Only A exists, both A and B exist, and only B exists. The character "/" in the present disclosure generally indicates an "or" relationship between the associated objects.

The sequence numbers of the foregoing embodiments of the present disclosure are merely for description purpose but do not necessarily imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely certain embodiments of the present disclosure, and are not intended to limit the present disclosure. Any modification, equivalent replacement, improvement and the like made within the spirit and principle of the present disclosure shall fall within the protection scope of the present disclosure.

What is claimed is:

1. A broadcast method for a virtual network group, applied to a user plane function (UPF), the method comprising:
   receiving a broadcast data packet transmitted by a member in the virtual network group, a target address of the broadcast data packet being a broadcast address;
   transmitting the broadcast data packet to a target internal broadcast interface in at least two internal broadcast interfaces, the at least two internal broadcast interfaces including a first internal broadcast interface and a second internal broadcast interface; and
   transmitting the broadcast data packet to all members or all local members in the virtual network group by using the target internal broadcast interface,
   wherein transmitting the broadcast data packet comprises:
      in response to determining the broadcast data packet is from a first reference point or a second reference point: transmitting the broadcast data packet to the first internal broadcast interface, and transmitting, by using the first internal broadcast interface, the broadcast data packet to all the members in the virtual network group by using the first reference point, the second reference point, a third reference point, or a fourth reference point respectively corresponding to each member in the virtual network group; and
      in response to determining the broadcast data packet is from the third reference point or the fourth reference point: transmitting the broadcast data packet to the second internal broadcast interface, and transmitting, by using the second internal broadcast interface, the broadcast data packet to all the local members of the UPF by using the first reference point or the second reference point respectively corresponding to each local member of the UPF,
   wherein the first reference point is between an access network and the UPF, the second reference point is between the UPF and another UPF, the third reference point is between the UPF and a data network, and the fourth reference point is between the UPF and another protocol data unit session anchor point user plane function (PSA UPF).

2. The method according to claim 1, wherein the at least two internal broadcast interfaces further includes a third internal broadcast interface, and wherein transmitting the broadcast data packet comprises:

in response to determining the broadcast data packet is from the third reference point: transmitting the broadcast data packet to the second internal broadcast interface, and transmitting, by using the second internal broadcast interface, the broadcast data packet to all the local members of the UPF by using the first reference point or the second reference point respectively corresponding to each local member of the UPF; and in response to determining the broadcast data packet is from the fourth reference point: transmitting the broadcast data packet to the third internal broadcast interface, and transmitting, by using the third internal broadcast interface, the broadcast data packet to all the local members of the UPF by using the first reference point or the second reference point respectively corresponding to each local member of the UPF in the virtual network group.

3. The method according to claim 1, wherein the UPF is provided with a first packet detection rule (PDR) and a first forwarding action rule (FAR) corresponding to the local member, and wherein transmitting the broadcast data packet comprises:

transmitting, in response to determining, by using the first PDR, that the broadcast data packet is from the first reference point or the second reference point, the broadcast data packet to the first internal broadcast interface by using the first FAR.

4. The method according to claim 3, wherein there is one first internal broadcast interface, a source interface is set as an access side, a target address is set as a broadcast address list, core network tunnel information is set as a tunnel header of a first reference point or a second reference point of a protocol data unit (PDU) session, and a target interface is set as the first internal broadcast interface; or there are m first internal broadcast interfaces, an $i^{th}$ first internal broadcast interface corresponds to an $i^{th}$ broadcast address, the $i^{th}$ broadcast address is a broadcast address in the broadcast data packet, a source interface is set as an access side, a target address is set as the $i^{th}$ broadcast address, core network tunnel information is set as a tunnel header of a first reference point or a second reference point of a PDU session, a target interface is set as the $i^{th}$ first internal broadcast interface, m being a positive integer, and i being an integer not greater than m.

5. The method according to claim 1, wherein the UPF is provided with a second PDR and a second FAR that correspond to a group-level session, the group-level session being a session shared by members in the virtual network group, and a session between the UPF and a session management function (SMF), and wherein transmitting the broadcast data packet comprises:

transmitting, in response to determining, by using the second PDR, that the broadcast data packet is from the third reference point, the broadcast data packet to the second internal broadcast interface by using the second FAR.

6. The method according to claim 5, wherein there is one second internal broadcast interface, a source interface is set as a core side, a target address is set as a broadcast address list, and a target interface is set as the second internal broadcast interface; or there are m second internal broadcast interfaces, an $i^{th}$ second internal broadcast interface corresponds to an $i^{th}$ broadcast address, the $i^{th}$ broadcast address is a broadcast address in the broadcast data packet, the second PDR comprises that: a source interface is set as a core side, a target address is set as the $i^{th}$ broadcast address, a target interface is set as the $i^{th}$ second internal broadcast interface, m being a positive integer, and i being an integer not greater than m.

7. The method according to claim 1, wherein the UPF is provided with a third PDR and a third FAR that correspond to a group-level session, the group-level session being a session shared by members in the virtual network group, and a session between the UPF and an SMF, and wherein transmitting the broadcast data packet comprises:

transmitting, in response to determining, by using the third PDR, that the broadcast data packet is from the fourth reference point, the broadcast data packet to the second internal broadcast interface by using the third FAR.

8. The method according to claim 7, wherein there is one second internal broadcast interface, a source interface is set as a core side, a target address is set as a broadcast address list, core network tunnel information is set as a tunnel header of the fourth reference point, and a target interface is set as the second internal broadcast interface; or there are m second internal broadcast interfaces, an $i^{th}$ second internal broadcast interface corresponds to an $i^{th}$ broadcast address, the $i^{th}$ broadcast address is a broadcast address in the broadcast data packet, the third PDR comprises that: a source interface is set as a core side, a target address is set as the $i^{th}$ broadcast address, core network tunnel information is set as a tunnel header of the fourth reference point, a target interface is set as the $i^{th}$ second internal broadcast interface, m being a positive integer, and i being an integer not greater than m.

9. The method according to claim 1, wherein the UPF is provided with a fourth PDR and a fourth FAR that correspond to members in the virtual network group, and wherein transmitting the broadcast data packet to all the members in the virtual network group comprises:

transmitting, in response to determining, by using the fourth PDR, that the broadcast data packet is from the first internal broadcast interface, the broadcast data packet to all the members in the virtual network group by using the first reference point, the second reference point, the third reference point, or the fourth reference point respectively corresponding to each member in the virtual network group by using the fourth FAR.

10. The method according to claim 9, wherein there is one first internal broadcast interface, and the fourth PDR comprises that: a source interface is set as the first internal broadcast interface, and a target address is set as a broadcast address list; and the fourth FAR comprises that: an external header creates tunnel information indicating the first reference point or the second reference point, and a target interface is an access side; or the fourth FAR further comprises that: an external header creates information indicating the third reference point, and a target interface is a core side; or the fourth FAR further comprises that: an external header creates tunnel information indicating the fourth reference point, and a target interface is a core side; or there are m first internal broadcast interfaces, an $i^{th}$ first internal broadcast interface corresponds to an $i^{th}$ broadcast address, and the $i^{th}$ broadcast address is a broadcast address in the broadcast data packet; the fourth PDR comprises that: a source interface is set as the $i^{th}$ first internal broadcast interface, and a target address is set as the i$^{th}$ broadcast address; and the fourth FAR comprises that: an external header creates tunnel information indicating the first reference point or the second reference point, and a target interface is an access side; or the fourth FAR further comprises that: an external header creates information indicating the third reference point, and a target interface is a core side; or the fourth FAR further comprises that: an external header creates tunnel information indicating the fourth reference point, and a target interface is a core side, m being a positive integer, and i being an integer not greater than m.

11. The method according to claim 1, wherein the UPF is provided with a fifth PDR and a fifth FAR that correspond to a group-level session, the group-level session being a session shared by members in the virtual network group, and a session between the UPF and an SMF, and wherein transmitting the broadcast data packet to all the local members of the UPF comprises:
  transmitting, in response to determining, by using the fifth PDR, that the broadcast data packet is from the second internal broadcast interface, the broadcast data packet to all the local members of the UPF by using the first reference point or the second reference point respectively corresponding to each local member of the UPF by using the fifth FAR.

12. The method according to claim 11, wherein
  there is one second internal broadcast interface, a source interface is set as the second internal broadcast interface, a target address is set as a broadcast address list, an external header creates tunnel information indicating the first reference point or the second reference point, and a target interface is an access side; or
  there are m second internal broadcast interfaces, an i second internal broadcast interface corresponds to an i$^{th}$ broadcast address, the i$^{th}$ broadcast address is a broadcast address in the broadcast data packet, the fifth PDR comprises that: a source interface is set as the i$^{th}$ second internal broadcast interface, a target address is set as the i$^{th}$ broadcast address, an external header creates tunnel information indicating the first reference point or the second reference point, a target interface is an access side, m being a positive integer, and i being an integer not greater than m.

13. The method according to claim 2, wherein the UPF is provided with a sixth PDR and a sixth FAR that correspond to a group-level session, the group-level session being a session shared by members in the virtual network group, and a session between the UPF and an SMF, and wherein transmitting the broadcast data packet to the third internal broadcast interface comprises:
  transmitting, in response to determining, by using the sixth PDR, that the broadcast data packet is from the fourth reference point, the broadcast data packet to the third internal broadcast interface by using the sixth FAR.

14. The method according to claim 13, wherein
  there is one third internal broadcast interface, a source interface is set as a core side, a target address is set as a broadcast address list, core network tunnel information is set as a tunnel header of the fourth reference point, and a target interface is set as the third internal broadcast interface; or
  there are m third internal broadcast interfaces, an i$^{th}$ third internal broadcast interface corresponds to an i$^{th}$ broadcast address, the i$^{th}$ broadcast address is a broadcast address in the broadcast data packet, a source interface is set as a core side, a target address is set as the i$^{th}$ broadcast address, core network tunnel information is set as a tunnel header of the fourth reference point, a target interface is set as the i$^{th}$ third internal broadcast interface, m being a positive integer, and i being an integer not greater than m.

15. The method according to claim 2, wherein the UPF is provided with a seventh PDR and a seventh FAR that correspond to a group-level session, the group-level session being a session shared by members in the virtual network group, and a session between the UPF and an SMF, and wherein transmitting the broadcast data packet to all the local members of the UPF comprises:
  transmitting, in response to determining, by using the seventh PDR, that the broadcast data packet is from the third internal broadcast interface, the broadcast data packet to all the local members of the UPF by using the first reference point or the second reference point respectively corresponding to each local member of the UPF in the virtual network group by using the seventh FAR.

16. The method according to claim 15, wherein
  there is one third internal broadcast interface, a source interface is set as the third internal broadcast interface, a target address is set as a broadcast address list, an external header creates tunnel information indicating the first reference point or the second reference point, and a target interface is an access side; or
  there are m third internal broadcast interfaces, an i$^{th}$ third internal broadcast interface corresponds to an i$^{th}$ broadcast address, the i$^{th}$ broadcast address is a broadcast address in the broadcast data packet, a source interface is set as the i$^{th}$ third internal broadcast interface, a target address is set as the ith broadcast address, an external header creates tunnel information indicating the first reference point or the second reference point, a target interface is an access side, m being a positive integer, and i being an integer not greater than m.

17. The method according to claim 1, wherein the at least two internal broadcast interfaces include m second internal broadcast interfaces, each second internal broadcast interface being corresponding to one broadcast address, and m being a quantity of broadcast addresses, and wherein transmitting the broadcast data packet to the target internal broadcast interface comprises:
  in response to determining the broadcast data packet is from the third reference point or the fourth reference point, and a broadcast address of the broadcast data packet is an i$^{th}$ broadcast address, transmitting the broadcast data packet to the second internal broadcast interface corresponding to the i$^{th}$ broadcast address, and transmitting, by using the second internal broadcast interface corresponding to the i$^{th}$ broadcast address, the broadcast data packet to all the local members of the UPF by using the first reference point or the second reference point respectively corresponding to each local member of the UPF,
  m and i being positive integers, and i being not greater than m.

18. A broadcast apparatus, comprising: a memory storing computer program instructions; and a processor coupled to the memory and configured to execute the computer program instructions and perform:
  receiving a broadcast data packet transmitted by a member in a virtual network group, a target address of the broadcast data packet being a broadcast address;

transmitting the broadcast data packet to a target internal broadcast interface in at least two internal broadcast interfaces, the at least two internal broadcast interfaces including a first internal broadcast interface and a second internal broadcast interface; and transmitting the broadcast data packet to all members or all local members in the virtual network group by using the target internal broadcast interface, wherein transmitting the broadcast data packet comprises:
  in response to determining the broadcast data packet is from a first reference point or a second reference point: transmitting the broadcast data packet to the first internal broadcast interface, and transmitting, by using the first internal broadcast interface, the broadcast data packet to all the members in the virtual network group by using the first reference point, the second reference point, a third reference point, or a fourth reference point respectively corresponding to each member in the virtual network group; and
  in response to determining the broadcast data packet is from the third reference point or the fourth reference point: transmitting the broadcast data packet to the second internal broadcast interface, and transmitting, by using the second internal broadcast interface, the broadcast data packet to all the local members of the UPF by using the first reference point or the second reference point respectively corresponding to each local member of the UPF,
  wherein the first reference point is between an access network and the UPF, the second reference point is between the UPF and another UPF, the third reference point is between the UPF and a data network, and the fourth reference point is between the UPF and another protocol data unit session anchor point user plane function (PSA UPF).

19. A non-transitory computer-readable storage medium storing computer program instructions executable by at least one processor to perform:
  receiving a broadcast data packet transmitted by a member in a virtual network group, a target address of the broadcast data packet being a broadcast address;
  transmitting the broadcast data packet to a target internal broadcast interface in at least two internal broadcast interfaces, the at least two internal broadcast interfaces including a first internal broadcast interface, a second internal broadcast interface, and a third internal broadcast interface; and
  transmitting the broadcast data packet to all members or all local members in the virtual network group by using the target internal broadcast interface, wherein:
  wherein transmitting the broadcast data packet comprises:
    in response to determining the broadcast data packet is from a first reference point or a second reference point: transmitting the broadcast data packet to the first internal broadcast interface, and transmitting, by using the first internal broadcast interface, the broadcast data packet to all the members in the virtual network group by using the first reference point, the second reference point, a third reference point, or a fourth reference point respectively corresponding to each member in the virtual network group;
    in response to determining the broadcast data packet is from the third reference point: transmitting the broadcast data packet to the second internal broadcast interface, and transmitting, by using the second internal broadcast interface, the broadcast data packet to all the local members of the UPF by using the first reference point or the second reference point respectively corresponding to each local member of the UPF; and
    in response to determining the broadcast data packet is from the fourth reference point: transmitting the broadcast data packet to the third internal broadcast interface, and transmitting, by using the third internal broadcast interface, the broadcast data packet to all the local members of the UPF by using the first reference point or the second reference point respectively corresponding to each local member of the UPF in the virtual network group,
  wherein the first reference point is between an access network and the UPF, the second reference point is between the UPF and another UPF, the third reference point is between the UPF and a data network, and the fourth reference point is between the UPF and another protocol data unit session anchor point user plane function (PSA UPF).

* * * * *